United States Patent [19]
Dixon

[11] Patent Number: 6,023,242
[45] Date of Patent: Feb. 8, 2000

[54] ESTABLISHING COMMUNICATION WITH A SATELLITE

[75] Inventor: Charles Stephen Dixon, Sawbridgeworth, United Kingdom

[73] Assignee: Northern Telecom Limited, Montreal, Canada

[21] Appl. No.: 09/111,240

[22] Filed: Jul. 7, 1998

[51] Int. Cl.$^7$ ................................................ H01Q 3/00
[52] U.S. Cl. ............................................................ 342/359
[58] Field of Search ............................ 342/359; 455/13.3

[56] References Cited

U.S. PATENT DOCUMENTS

| | | | |
|---|---|---|---|
| 5,347,286 | 9/1994 | Babitch | 342/359 |
| 5,471,219 | 11/1995 | Rodeffer et al. | 342/359 |
| 5,585,804 | 12/1996 | Rodeffer | 342/359 |
| 5,678,171 | 10/1997 | Toyama et al. | 342/359 X |
| 5,860,056 | 1/1999 | Pond | 342/359 X |
| 5,880,693 | 3/1999 | Drummer | 342/357 |

*Primary Examiner*—Mark Hellner
*Attorney, Agent, or Firm*—Lee, Mann, Smith, McWilliams, Sweeney & Ohlson

[57] ABSTRACT

An Earth station having an antenna is configured to establish communication with a satellite. The Earth station stores a table of satellite position data for a plurality of satellites and is configurable to enable its own location position on the surface of the Earth as well as the azimuth and elevation of its antenna to be obtained. The tabulated satellite position data is then utilised to calculate the position of the satellite in relation to the location position. Thereafter at least one of the satellites is selected with which to establish communication and in response to the selection and the obtained azimuth and elevation, a direction is determined in which to configure the antenna for operation with the at least one selected satellite. Following determination of the direction, the antenna is configured for operation with the at least one selected satellite. The location position and the azimuth and elevation of the antenna may be determined through the Earth station comprising a GPS receiver. The Earth station may be configured as a mobile, portable or fixed unit and the invention is configurable to enable communication to be established with geostationary satellites, non-geostationary satellites or a combination of both geostationary and non-geostationary satellites.

43 Claims, 19 Drawing Sheets

| Earth Station Type | Satellite Type |
| --- | --- |
| 1. Mobile (moving) | non-geostationary (+/- geostationary) |
| 2. Mobile (moving) | geostationary |
| 3. Portable (stationary when in use) | non-geostationary (+/- geostationary) |
| 4. Portable | geostationary |
| 5. Permanently fixed | non-geostationary (+/- geostationary) |
| 6. Permanently fixed | geostationary |

Fig. 1

| Satellite ID number : 0001 | | ⎯ 701 |
|---|---|---|
| Health: 000 | | ⎯ 704 |
| TOA: | 61440.0000 | ⎯ 705 |
| e: | 35567283630E-003 | ⎯ 706 |
| i: | 0.9547017813 | ⎯ 707 |
| $\Omega$ : | -7.9317592494E-009 | ⎯ 708 |
| $\sqrt{A}$: | 5153.572754 | ⎯ 709 |
| $\Omega_{TOA}$: | -2.9067027569E+000 | ⎯ 710 |
| $\omega$ : | -10484642506 | ⎯ 711 |
| $m_0$: | -7.0817857981E-001 | ⎯ 712 |

| Satellite ID number : 0002 | | ⎯ 702 |
|---|---|---|
| Health: 000 | | |
| TOA: | 61440.0000 | |
| e: | 1.5962600708E-002 | |
| i: | 0.9450724721 | |
| $\Omega$ : | -7.8974720097E-009 | |
| $\sqrt{A}$: | 5153.631836 | |
| $\Omega_{TOA}$: | -8.7146401405E-001 | |
| $\omega$ : | -2.425915480 | |
| $m_0$: | 1.4322246313E+000 | |

| Satellite ID number : N | | ⎯ 703 |
|---|---|---|
| Health: 000 | | |
| TOA: | 61440.0000 | |
| e: | 2.15783611283E-003 | |
| i: | 0.9632554817 | |
| $\Omega$ : | -7.8473125881E-009 | |
| $\sqrt{A}$: | 5153.001254 | |
| $\Omega_{TOA}$: | -4.5781216331E+000 | |
| $\omega$ : | -2.2112372413 | |
| $m_0$: | -5.1729643557E-001 | |

Fig. 7

ESTABLISHING COMMUNICATION WITH A SATELLITE

FIELD OF THE INVENTION

The present invention relates to establishing communication between a satellite and an Earth station.

BACKGROUND OF THE INVENTION

Communications systems are known which provide greater flexibility in terms of a given user being able to move around freely. Thus for example, mobile communications systems are known wherein a user operates a handset which receives and transmits signals to a base station within a cell and wherein a plurality of cells exist over a given area of the Earth's surface. Mobile telecommunications systems of this kind have a disadvantage in that there may be areas of the Earth's surface which are not provided with a base station and therefore the hand held user unit cannot be used in these circumstances.

Various groups of people exist wherein (a) greater flexibility is required with respect to provision of telecommunications links; (b) telecommunications services are required where no terrestrial alternative exists; or (c) telecommunications services based on a terrestrial infrastructure may be unavailable for some reason, such as during a war, following a flood or following an earthquake for example. Thus for example business people and media reporters may frequently find themselves in remote locations where a suitable telecommunications link is not provided. Thus for example a media reporter working in a remote location, possibly in a war zone or a relatively uncharted territory may require to utilize a telecommunications link so as to establish communication with work colleagues or work headquarters. Communication systems are known which offer a greater degree of flexibility in terms of establishing a telecommunications link in a remote area such as for example satellite telephones, frequently referred to in the art as "Satphones". Satellite telephones are typically hand held devices and allow a given user to establish a telephone conversation via a satellite link. A satellite telephone generally comprises a hand held device together with an antenna which may be connected to the telephone via a suitable connection and which may be deployed in a position on the ground or other suitable structure for directing into the sky. Known satellite telephone antennae are configured to have a broad beam (that is an omnidirectional beam), so that communication may readily be established with a suitable orbiting satellite such as a geostationary satellite. A known system of this type is disclosed in U.S. Pat. No. 5,471,219. Broad beam systems are also generally discussed in the paper by Cullen & Benedicto[1]. By having a broad beam it is relatively simple for the antenna to locate a suitable artificial satellite, and in such a system, at the very most, a given satellite telephone user may be required to slightly alter the position of the antenna to establish a suitable communication link with the satellite, the requirements on the user being minimized in terms of time and effort required to locate a suitable satellite.

However, satellite telephone systems of the type described are generally restricted to communications comprising telephone conversations or transmission of relatively low data content messages (eg, Internet e-mail messages) each requiring a relatively low rate of data transmission. Many applications exist wherein the amount of data that it is desired to be transmitted is more substantial. Examples of more substantial data requiring higher data transmission rates include for example relatively large text files, video images and in particular communications comprising a video component in addition to an audio component, these latter systems being known as "video telephones".

With advancements in technology, there is increased demand by users of communication systems for improved and enhanced communications services and in particular, there is a need for a method and apparatus for facilitating communication between a person located in a remote area for example and a head office, wherein the communications services available include provision for modes of communication requiring a greater bandwidth. By bandwidth it is meant the rate of data transfer, and thus there is a need for a communications system configurable for operation in a diverse range of locations (including remote locations for example) which facilitates a higher data rate than a conventional satellite telephone.

SUMMARY OF THE INVENTION

According to a first aspect of the present invention there is provided a method of establishing communication with a satellite, comprising steps of: at an earth based communications device having an antenna capable of transmitting and receiving a radiation beam:

storing satellite position data for at least one satellite;

obtaining a location position data of said earth based communications device;

obtaining an azimuth and elevation of said antenna; utilizing said satellite position data to calculate a position data of said at least one satellite in relation to said location position;

in response to said obtained azimuth and elevation data, determining a direction in which to configure an antenna for operation with said at least one satellite; and configuring said antenna for operation in said direction.

In a preferred embodiment the antenna comprises an electronically steerable phased array arrangement. The antenna is suitably configurable to operate as a substantially narrow beam.

In a preferred embodiment the stored position data comprises orbital parameters of non-geostationary satellites and preferably the stored position data comprises orbital information of at least one geostationary satellite. Suitably the stored position data is time stamped to enable correction of the data for the time elapsed since the data was created. Furthermore the stored position data is preferably accompanied by a parameter indicating a reliability of the data and preferably the stored position data may be derived by downloading the data from a satellite.

Preferably the step of obtaining the location position comprises obtaining geocentric equatorial co-ordinates of the earth based communications device and suitably this step comprises obtaining the location position information from a GPS satellite.

The step of obtaining the azimuth and elevation of the antenna suitably may comprise the steps of:

electronically reading a compass to find the direction of true North; and electronically reading a level finding device.

Alternatively the step of obtaining the azimuth and elevation may comprise the earth based communications device utilizing GPS data via a plurality of antenna.

In one embodiment the earth based communications device is mobile. The communications device may be mounted on a vehicle. In a further embodiment the earth based communications device may be portable.

In any of the above mentioned preferred embodiments the communications device may comprise a lap top type computational device.

In the preferred embodiment the step of calculating the position of the satellites in relation to the location position comprises calculating the azimuth and the elevation of the satellites.

For non-geostationary satellites, in the preferred implementation, the calculation of the position of the satellites in relation to the location position comprises, for a given satellite, the steps of:

calculating the mean motion of the satellite and the mean anomaly;

calculating the eccentric anomaly;

calculating the true anomaly and the orbital co-ordinates of the satellite;

calculating the position of the satellite in relation to the center of the Earth;

calculating the satellite's position co-ordinates in relation to the earth based communications device; and calculating the satellite's azimuth and elevation in relation to the earth based communications device.

In the preferred embodiment the step of calculating the position of the satellites in relation to the location position may additionally comprise calculation of the range of the satellites from the communications device.

Preferably the step of selecting at least one of the satellites comprises determination of the period of time available before the satellite substantially reaches a horizon viewable from a position of the earth based communications device.

Furthermore in the case of non-geostationary satellite communication the step of determining a direction in which to configure the antenna for operation comprises the step of determining one or more further directions to facilitate hand over of communications from a first satellite to a second satellite.

Finally, in the preferred embodiment for a mobile communications device, the determined direction is suitably updated in real time to facilitate continuous communication with the moving communications device.

According to a second aspect of the present invention there is provided an earth based communications apparatus configurable to establish communication with a satellite, the apparatus comprising:

an antenna for transmitting and receiving data;

storage means for storing satellite position data for at least one satellite;

means for obtaining a location position of the communications device;

means for obtaining azimuth data and elevation data of the antenna;

position calculation means for utilizing the satellite position data to calculate the position of said at least one satellite in relation to the location position;

direction determination means responsive to said obtained azimuth and elevation; and means for configuring the antenna for operation in the determined direction.

The apparatus preferably comprises selection means for selecting at least one of a plurality of satellites, wherein said direction determining means is responsive to said selection means to determine a beam direction.

In a preferred embodiment the antenna may comprise an electronically steerable phased array antenna.

Suitably the table of position data comprises orbital parameters associated with each of the satellites and the stored position data is time stamped.

In a preferred embodiment the means for obtaining the location position may comprise a GPS receiver for receiving information from a GPS satellite.

Suitably the means for obtaining the azimuth and elevation of the antenna may comprise an electronic compass and an electronic level finding device.

Alternatively the means for obtaining the azimuth and elevation of the antenna may comprise a plurality of antennae, each of the antennae being configured to communicate with a GPS satellite.

In one preferred embodiment the Earth station may be mounted on a vehicle.

Suitably the position calculation means comprises means for calculating the azimuth and elevation of a given satellite.

In a preferred embodiment the position calculation means for a given satellite comprises means for:

calculating a mean motion of the satellite and the mean anomaly; calculating an eccentric anomaly;

calculating a true anomaly and orbital co-ordinates of the satellite;

calculating a position of the satellite in relation to the center of the Earth;

calculating the satellite's position co-ordinates in relation to the earth based communications device; and calculating the satellite's azimuth and elevation relation to the earth based communications device.

In a further preferred embodiment the position calculation means also comprises means for calculating the range of a given satellite from the Earth station.

Preferably the selection means comprises means for determining the period of time available before the satellite substantially reaches the Earth station's horizon.

In the case of non-geostationary satellite communication the direction determination means comprises means for determining one or more further directions to facilitate hand over of communications from a first satellite to a second satellite.

Finally in the preferred embodiment the direction determination means additionally comprises means for updating, in real time, the determined direction so as to facilitate continuous communication with a moving Earth station.

According to a third aspect of the present invention there is provided a satellite communications link for facilitating communication with an earth based communications device having an antenna, the link being configured in accordance with the station performing the steps of:

storing a table of satellite position data for a plurality of satellites;

obtaining the location position of the earth based communications device; obtaining the azimuth and elevation of the antenna;

utilizing said tabulated satellite position data to calculate the position of at least one satellite in relation to the location position;

in response to the selection and the obtained azimuth and elevation data, determining a direction in which to configure the antenna for operation with at least one satellite; and configuring said antenna for operation in the determined direction.

Preferably the satellite communications link facilitates the transmission of and the receiving of information by the earth based communications device.

To facilitate a higher band width the communications link is suitably established through configuration of a substantially narrow beam.

Preferably the satellite communications link comprises communication between the earth based communications device and a first satellite followed by communication between the communications device and at least a second satellite so as to facilitate a communications hand over between satellites.

Suitably the communications link is established in response to the calculated position of the satellite in relation to the location position.

In a preferred embodiment the link may be configurable to provide a video conferencing facility, such that images such as video images, in addition to speech or text data may be transmitted to and from the communications device.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 1 comprises a table identifying various Earth station-satellite configurations wherein communication may be established in accordance with the present invention;

FIG. 7 details a look up table holding orbital parameter data for a plurality of non-geostationary satellite, of the type identified in FIG. 6;

DETAILED DESCRIPTION OF THE BEST MODE FOR CARRYING OUT THE INVENTION

Figure 2:
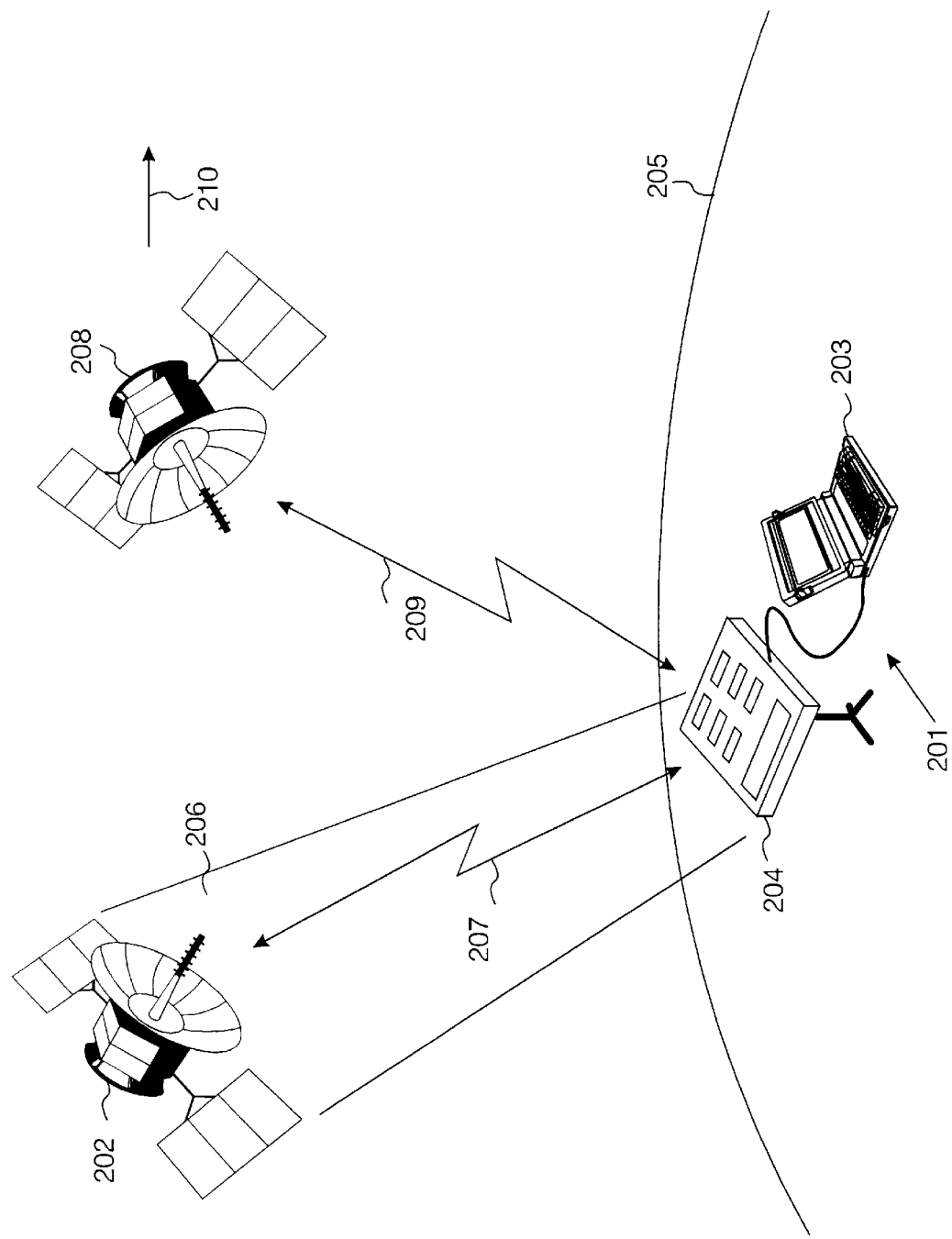
FIG. 2 schematically illustrates a portable Earth station communications device configurable for establishing communication with one or more communications satellites and one or more GPS satellites and identifies an Earth station antenna for transmitting and receiving information.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

The invention described herein relates to establishing communication between a satellite and an Earth station. By Earth station it is meant a site containing radio equipment, which is used for sending and receiving information from a satellite in orbit. The invention herein may be considered to comprise a plurality of embodiments depending upon the particular application. Thus in a first preferred embodiment, an Earth station is configured as a mobile station which may be configured to communicate with either non-geostationary satellites or geostationary satellites. By mobile it is meant an Earth station which is configured to communicate with a satellite whilst the Earth station itself is in motion across the Earth's surface for example. By motion across the Earth's surface it is meant movement across the Earth's surface at ground level or at altitude such as for example in an aeroplane. In a second preferred embodiment, the Earth station may be configured to be portable. By portable it is meant that the Earth station may be moved from one geographical location to another and may be located on a vehicle such as a car or a lorry or may be configured to be carried by a user. An Earth station of mobile or portable type may be configured to be approximately the size of a laptop computer and comprises computational means and an antenna. During use, a portable Earth station remains at substantially the same location with respect to the Earth's surface. Depending upon the application, the portable Earth station may be configured to communicate with geostationary satellites, or non-geostationary satellites or a combination of both geostationary and non-geostationary satellites. A third preferred embodiment comprises a fixed Earth station being configured to communicate with one or more geostationary satellites and a fourth embodiment comprises a fixed Earth station being configured to communicate with one or more non-geostationary satellite and/or one or more geostationary satellites.

In accordance with the present invention, the Earth station is configured to effect rapid acquisition of a communications satellite signal through accurate antenna pointing. As described in the background to the invention, satellite telephones are known which comprise an antenna configured to communicate with a satellite via a relatively broad beam. By "a broad beam antenna" it is meant a relatively low gain antenna. The gain of a given antenna is not to be confused with the power gain of an amplifier where a given power input is amplified by transforming power from the source to provide an increased signal power output. In contrast, antenna gain is essentially a measure of an antenna's directivity and may be considered to represent the ability of the antenna to transmit radiation in a defined direction and to receive radiation in a given direction. Formally, antenna gain is defined with reference to an idealized source (an isotropic radiator) that radiates equally in all directions. If $P_a$ is the power density radiated by the antenna in a given direction and $P_i$ is the power density radiated by an isotropic antenna fed with the same power then the antenna gain G is given by:

$$G = P_a/P_i \tag{1}$$

Antennas obey the principle of reciprocity such that the same directional radiation properties arise in both transmitting mode and receiving mode. The units of antenna gain are usually specified in decibel units (dB) or decibels relative to one watt (dBW).

Typically antenna beams comprise a main beam and a plurality of subsidiary beams. The beamwidth of an antenna specifies the angular width of the main beam radiated by an antenna and is normally taken between the half power (3 dB) point.

It is well-known that a paramount consideration in satellite link design relates to power budget, that is how much power can be obtained from the transmitter and how much of that power can be directed towards the receiver. A central problem relates to ensuring that the signal level at the detector is large enough to produce a satisfactory output. The output may vary throughout the year due to for example attenuation of transmitted signals through the atmosphere which may contain precipitation.

The principles relating to signal to noise ratios are now briefly described.

The power received at the satellite (or at an Earth station) $P_r$ is given by the following equation:

$$P_r = P_t \cdot G_t \cdot G_r \cdot \lambda^2/(4\pi r)^2 \text{ Watts} \tag{2}$$

where: $P_t$ is the power transmitted;
$G_t$ is the gain of the transmit antenna;
$G_r$ is the gain of the receiver antenna; $\lambda$ is the wavelength of the transmitted electromagnetic radiation; and R is the distance of the receiver from an isotropic source.
The effective noise power $N_i$ at a receiver input is given by:

$$N_i = k \cdot T_e \cdot B \tag{3}$$

where: $T_e$ is known as the effective system noise temperature specified in Kelvin; k is Boltzmann's constant; and B is the receiver bandwidth in hertz.

Using the second equation for the effective input noise, the signal to noise ratio at the receiver is obtained by dividing equation (2) by equation (3) to give:

From which we have the following equation of proportionality:

$$\frac{P_r}{N_i} \propto G_t \cdot P_t \tag{4}$$

ie, for a given received power, receiver antenna gain and frequency the signal to noise ratio at the receiver is proportional to the product $G_t \cdot P_t$. In other words a low transmit gain results in a relatively low signal to noise ratio.

According to Shannon's law if a channel has a bandwidth B and the mean signal to noise ratio is given by the signal power ($P_r$) divided by the noise power ($N_i$) then the maximum rate at which information may be transmitted is C bits per second where the channel capacity C is given by:

$$C = B\log_2(1 + P_r/N_i) \text{ bits/second} \tag{5}$$

From relationships 4 and 5 it is seen that the channel capacity C is directly proportional to the logarithm to the base 2 of unity plus the signal to noise ratio. From equations (4) and (5) it is seen that a low transmit gain gives a relatively low signal to noise ratio which in turn gives a relatively low data rate. Prior art Earth stations having a broad receive/transmit beam effectively have a relatively low antenna gain. From the above discussion it is clear that to increase channel capacity either the antenna power transmitted or the antenna gain (directivity of the antenna beam) must be increased.

For the applications of concern with respect to the present invention, increasing the power transmitted is not desirable for applications utilising a mobile or a portable Earth station, since mobile stations and portable stations are likely to be battery powered. Thus the present invention relates to increasing the antenna gain ($G_t$) which may be considered as providing a highly directional antenna beam. Provision of a highly directional antenna beam in this way is in contrast to known satellite telephone systems and requires a method and apparatus for rapidly acquiring a communication satellite signal in view of the fact that simple satellite identification (by virtue of having a broad beam) is no longer possible.

In accordance with the present invention, various configurations regarding Earth station—satellite communication are possible depending on the particular embodiment utilised and six main categories of Earth station—satellite systems are identified in FIG. 1. This first system comprises a mobile Earth station (that is a moving Earth station) being configurable to communicate with non-geostationary satellite. This embodiment may be configured to also communicate with geostationary satellites in addition to non-geostationary satellites. The second category comprises a mobile Earth station being configured to communicate with geostationary satellites and thus represents a simpler system than that identified above. The third category comprises a portable Earth station (that is an Earth station which is stationary when in use, but which may be moved from one location to another) and at least non-geostationary satellites. A system of this kind may be configured to establish communication between an Earth station and both non-geostationary and geostationary satellites. The fourth category comprises a portable Earth station being configured to communication with geostationary satellites. A portable Earth station or a mobile station may suitably be mounted or mountable on a vehicle, such as a tourist coach for example. The fifth category comprises an Earth station which is permanently fixed to the Earth's surface and which is configured to communicate with at least non-geostationary satellites. This embodiment may be configured to enable the permanently fixed Earth station to communicate with both non-geostationary and geostationary satellites. The sixth category comprises a permanently fixed Earth station being configured to communicate with geostationary satellites only. Of the above categories, the present invention is to be considered particularly related to categories one to five, the invention in general being considered to represent a system enabling the position of a given satellite to be identified in relation to a given Earth station.

The embodiments to be described hereafter vary as to the exact nature of data processing required in relation to tracking of satellites by a given Earth station. A central feature to all embodiments comprises accurate pointing of the antenna to a given satellite with which communication is required to be established. The more complex embodiments enable tracking of a non-geostationary satellite and this will be described below in relation to a portable Earth station, that is in relation to a category 3 system as identified in FIG. 1. Non-geostationary satellite tracking of this type, with relatively minor modification, is equally applicable to systems of type category 1 or category 5 as identified in FIG. 1. However, variations in processing in relation to category 1 and category will exist by virtue of the differences in the nature of the Earth station being employed (eg, if it is a mobile station), but it is to be understood by those skilled in the art that the tracking of non-geostationary satellites described for category 3 is to be considered substantially applicable to other categories and in particular to categories 1 and 5.

In accordance with the present invention, the apparatus provided for facilitating narrow beam satellite signal acquisition will now be described.

FIG. 2 schematically illustrates an overview of apparatus comprising a portable Earth station 201 for establishing communication with a communications satellite 202. In terms of the Category 3 embodiment satellite 202 may be a geostationary satellite or a non-geostationary satellite. Earth station 201 comprises processing unit 203 electronically connected (by a coaxial cable for example) to antenna arrangement 204. Earth unit 201 may be composed of a single unit or may comprise separate units 203 and 204 as illustrated. Processing unit 203 may for example comprise a laptop computer or some other suitable computational device. Furthermore, device 203 is preferably configurable to operate as a video telephone to provide a video conferencing facility to effect a video telephone call and to facilitate transfer of substantial data files. Satellite 202 may comprise a low Earth orbit (LEO) satellite, a medium Earth orbit (MEO) satellite or some other suitable communications satellite. In the example shown, Earth unit 201 is located upon the Earth's surface 205 or another suitable surface placed upon surface 205. Earth unit 201 is configurable to effect communication with satellite 202 via antenna 204 transmitting a radio wave or microwave beam 206. Communications signals may be transmitted via antenna 204 to satellite 202 and similarly signals may be transmitted from satellite 202 to antenna 204, this being indicated by double headed signaling arrow 207 representing the uplink and the downlink respectively. In relation to any of the embodiments identified as categories 1–4 in FIG. 1, Earth unit 201 is preferably configurable to receive navigational information from one or more satellites such as satellite 208, via transmission of radio (or microwave) signals 209. Satellite 208 is suitably a navigational satellite configured to provide positional information to Earth unit 201 and may be a geostationary satellite or a non-geostationary satellite as indicated by motion arrow 210. In accordance with the present invention, positional information identifying the position of Earth station 201 on the Earth's surface is required by Earth stations configured for operation in categories 1–4 in FIG. 1 and in the preferred embodiment the positional information is provided by a global positional system (GPS) receiver configured for reception of navigation signals from a plurality of satellites such as satellite 208.

Figure 3:
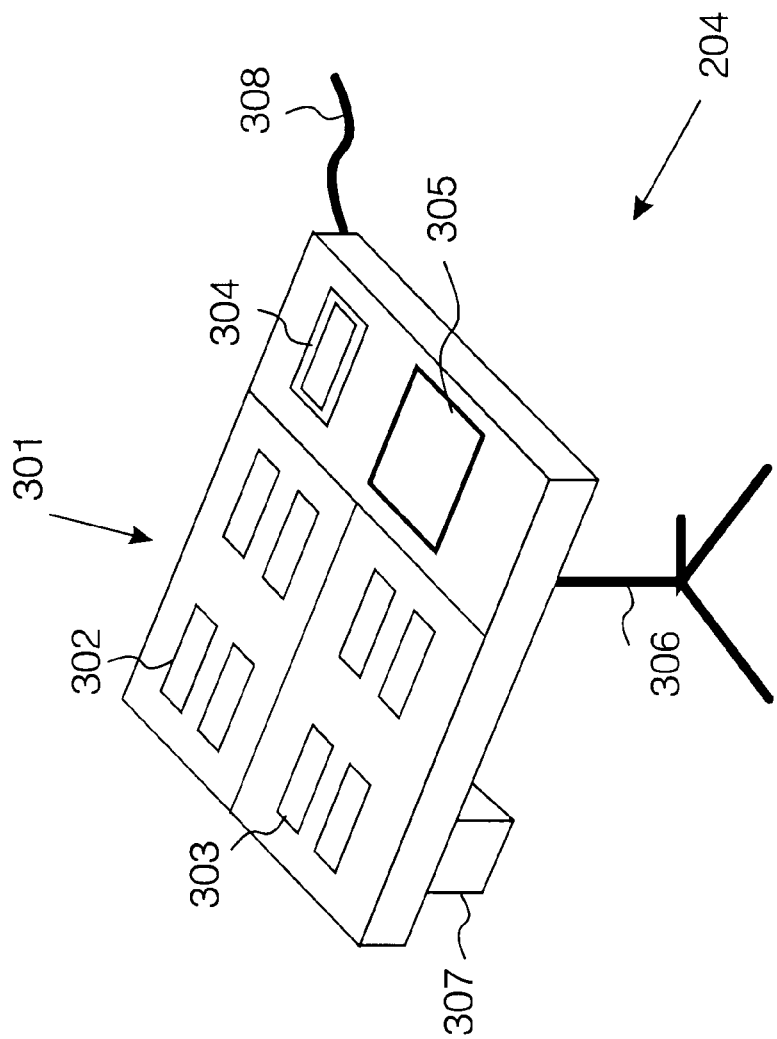
FIG. 3 schematically illustrates a preferred embodiment of the antenna identified in FIG. 1.

FIG. 3 schematically illustrates a preferred embodiment of antenna 204 identified in FIG. 2 which is suitable for applications comprising a portable Earth station. The preferred antenna arrangement 204 comprises a phased array antenna (otherwise known as an electronically steerable patch antenna) 301. A phased array antenna is suitable for any embodiment of an Earth station. Phased array antenna 301 may consist of a flat rectangular arrangement of small identical radiating elements (patches) 302, 303 etc. For illustrative purposes, only 4 patches are shown, but in practice a considerably greater number of such patches may be utilised. Each radiating element 202, 203, etc is fed a microwave or radio signal of equal amplitude, but the relative phase of the signals is electronically alterable across the face of the array. This allows the direction of the antenna beam to be altered rapidly with no mechanical movement of the antenna, the beam in effect being steered through the principle of wave interference. Suitably the radiating elements may be arranged into two groups - a first group comprising a transmitting antenna and a second group co-located on the same platform surface, for receiving signals from a communicating satellite. Furthermore, each group of elements is suitably configured to utilize a different frequency of electromagnetic radiation. Additionally each radiating element is preferably separated from its neighboring elements (or element) by at least a distance equivalent to half the wavelength or the electromagnetic radiation being utilized. Antenna arrangement 204 comprises a navigational satellite receiver 304 configured to receive Earth station positional information from a one or more of a number of navigational satellite such as satellite 208. Thus receiver 304 is configured to calculate the position of Earth station 201 in response to receiving positional data from satellite 208. For any of categories 1–5, antenna arrangement 204 also comprises means 305 for determining the orientation of antenna 301. By orientation it is meant the operational direction for transmitting and receiving a radiation beam. The required orientation information essentially comprises the elevation and azimuth angles of antenna 301. Thus orientation determination means 305 may comprise an electronic compass and electronic spirit levels or for example a laser gyroscope or a fiber optic gyroscope etc. Alternatively a plurality of antennae receivers may be utilised to enable communication with several GPS satellites to obtain the altitude and azimuth of the Earth station. Finally, antenna arrangement 204 suitably comprises a stand 306, a power source comprising a battery 307 and electronic connection means 308 for connecting antenna arrangement 204 to processing unit 203.

The preferred embodiment of antenna arrangement 204 is not to be construed as limiting the invention in any way. Thus for example antenna arrangement 204 may comprise a conventional steerable parabolic dish (or some other suitable antenna arrangement) having orientation determination means substantially of the type described. The orientation determination means is not necessarily electronically connected to processing unit 203 and may be configured to be operated by a human operator. In this latter embodiment, an operator would be required to read information provided on processing unit 203. The information provided may identify the position of Earth unit 201 on the Earth's surface and may identify the position of a suitable satellite 202 to or from which data is to be transferred. In this way, the user may manually adjust the orientation of the given antenna in accordance with the instructions provided on processing unit 203. This embodiment is considered to be particularly suited to categories 4 or 6. A more basic category 4 or 6 system may comprise orientation determination means provided with a suitable antenna arrangement and wherein a given operator simply determines his or her position on the Earth's surface from for example reading a map (and a compass and spirit levels provided on the Earth station) and additionally determines a position of a suitable satellite 202 via tables provided in hard copy form from a book. However, in the preferred embodiment, suitable for any of categories 1–6 the orientation of antenna arrangement 204 is automatically processed by processing unit 203 with appropriate antenna steering being effected thereafter. In the case of a phased array antenna, steering comprises providing each radiating element such as elements 302 and 303 with a microwave signal of equal amplitude, but wherein the relative phase of the signals is weighted electronically across the face of the array. Thus the advantage of using a phased array antenna is that no mechanical movement is required and so the amount of power consumed is reduced as compared with a mechanically adjustable automatically steered antenna.

Figure 4:
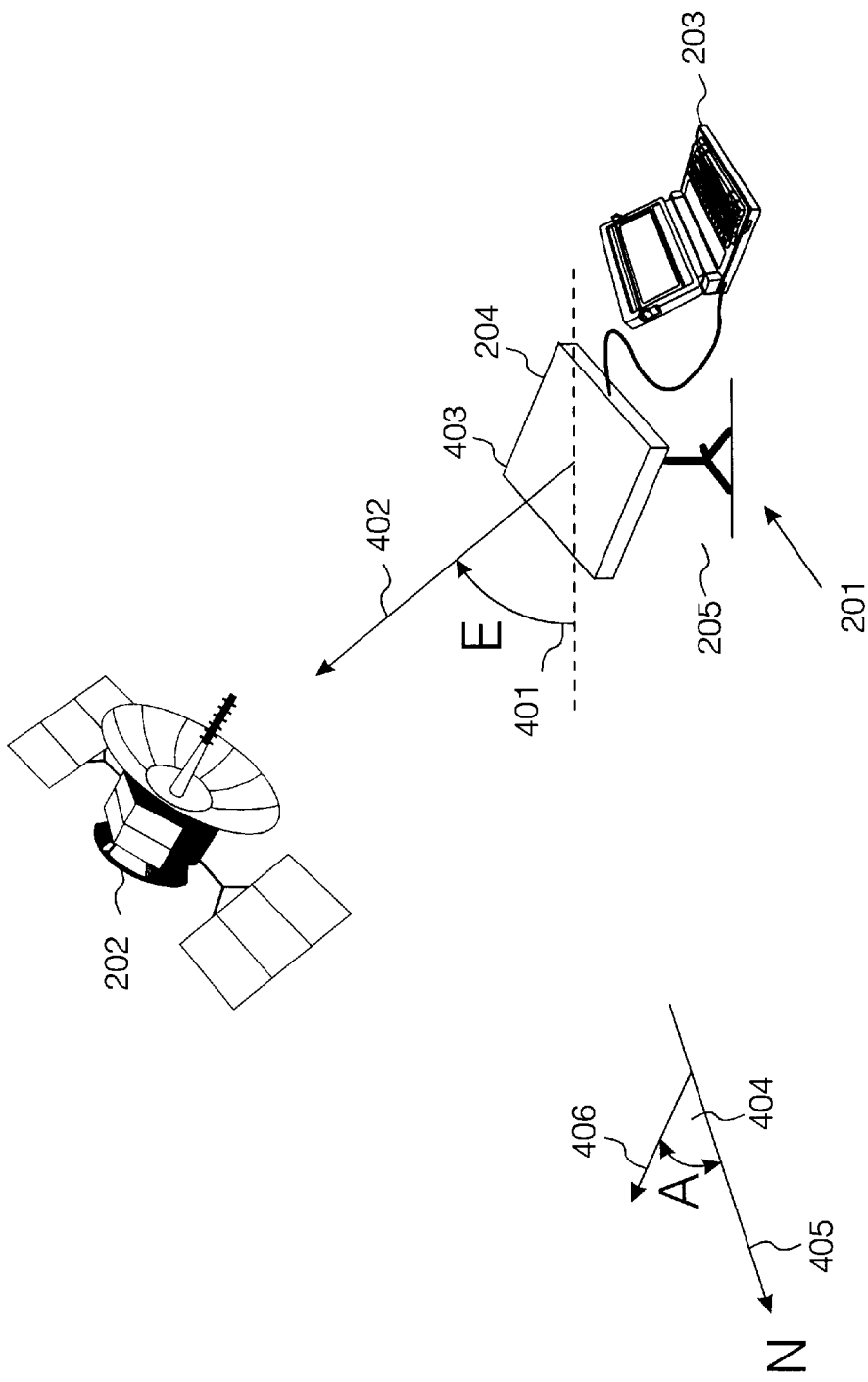
FIG. 4 schematically illustrates angles of azimuth and elevation of the antenna identified in the earlier figures.

FIG. 4 schematically illustrates the angles of azimuth and elevation (relevant to any of categories 1–5) of antenna 204 of Earth station 201 illustrated in FIG. 2. The angle of elevation, E of antenna 204 is identified at 401 and is essentially the angle measured with respect to the local horizontal from the Earth station to a coordinate axis 402 extending in a direction normal to the antenna radiating surface 403 and thus ranges from between zero degrees to 90 degrees. Alternatively the elevation angle may be defined as the angle between the vertical plane and the direction 402. The angle of azimuth is indicated at 404 and may be defined as the angle in the horizontal plane, taking true north as reference, and moving clockwise (eastwards) to effectively give the offset of the antenna direction from true north. Thus azimuth is seen to range from zero degrees to 360 degrees. The angle is labeled A and is seen to lie between the true North direction 405 and the direction in which the antenna is configured for operation relative to true North 406. Upon deploying antenna 204 upon surface 205, the angles of azimuth and elevation of the antenna radiating surface are obtained whereafter the angles of elevation and azimuth of the antenna beam are required to be adjusted so as to align the beam with satellite 202. Thus in the example shown, the antenna 204 is not exactly lined up with satellite 202, the angle of elevation being required to be reduced by a small proportion substantially to line up with the center of satellite 202. In the particular embodiment shown, antenna arrangement 204 comprises a phased array antenna wherein the antenna radiating surface itself is not required to be mechanically repositioned, but rather the direction of the radiation beam is modified in response to feeding each radiating element of the antenna calculated weighted phases of the transmitted signals so as to electronically determine the direction of the radiating beam.

Figure 5:
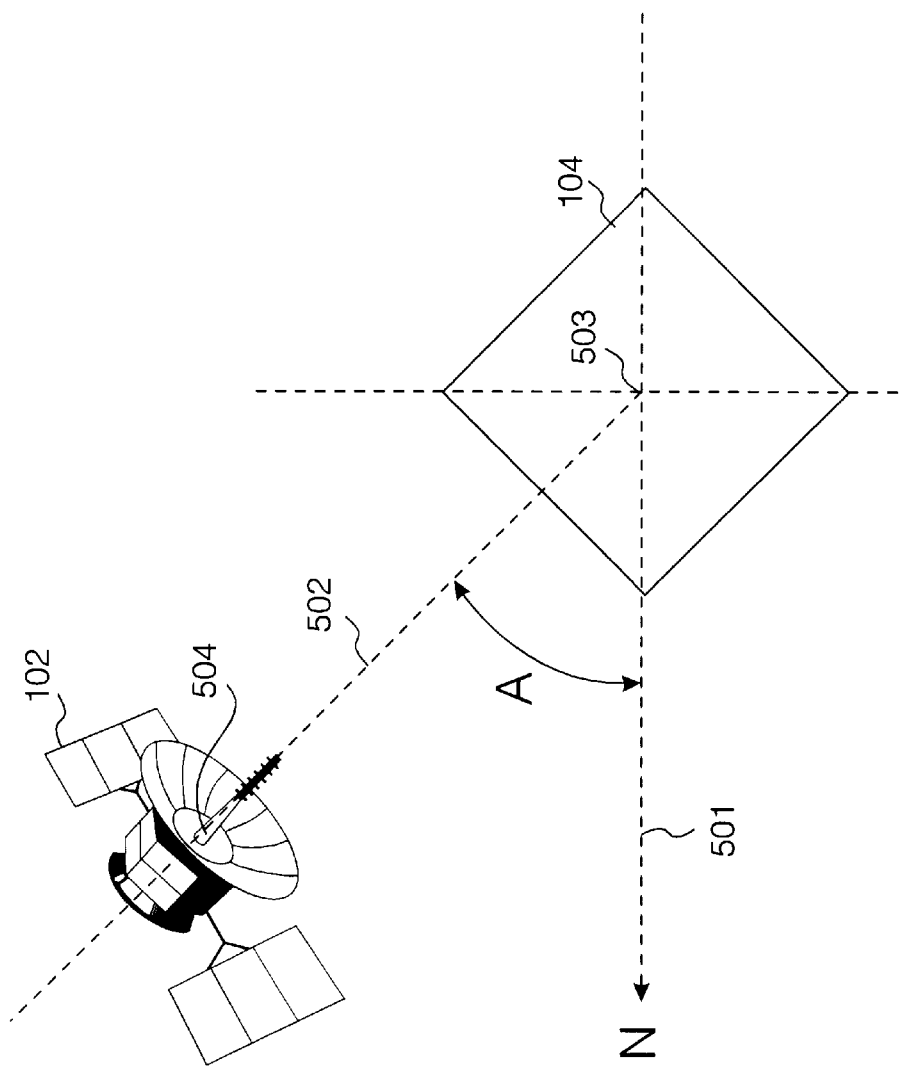
FIG. 5 in accordance with the present invention schematically illustrates the Earth station antenna identified in FIG. 4 following configuration for communication with a communication satellite.

FIG. 5 further details the angle of azimuth for the antenna arrangement identified in FIG. 4 and illustrates antenna 204 in plan view. Thus in effect the illustration represents a view looking down on the Earth: true north is represented by broken arrow direction 501 and the required angle of azimuth for antenna 204 to line up with satellite 202 is seen to be the angle between direction 501 and a line of sight connecting central point 503 of antenna 204 and the central point 504 of satellite 202.

Figure 6:
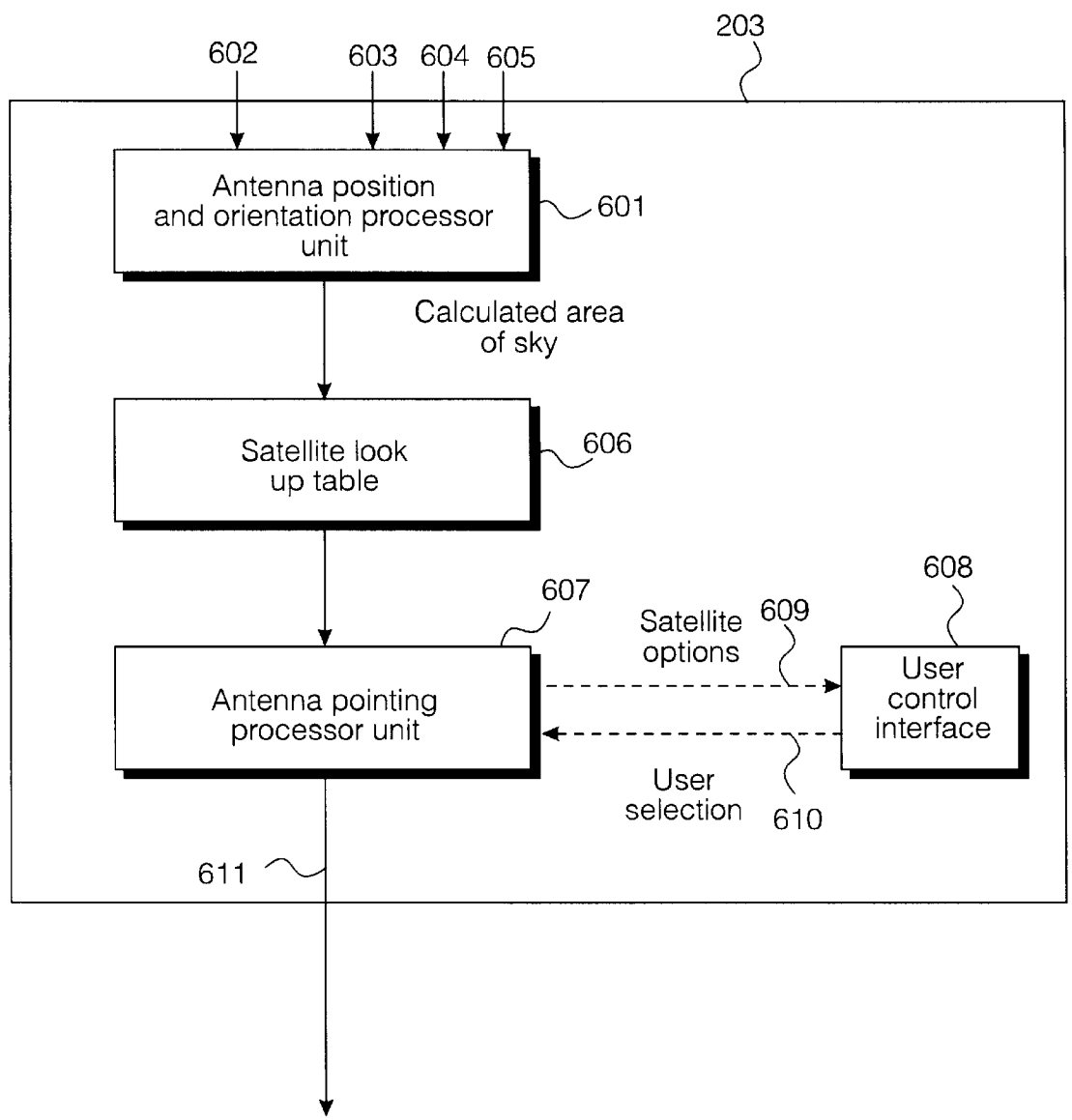
FIG. 6 schematically illustrates data processing and data storage components included within the Earth station identified in FIGS. 1 to 5 and comprises an antenna position and orientation processor unit and an antenna pointing processor unit.

FIG. 6 schematically illustrates data processing and data storage components included within an Earth Station processing unit, such as that (103) identified in FIG. 1 and FIG. 4. Processing device 203 may suitably comprise a lap top computational device or some other suitable computational device having for example an Intel®, Pentium®, MMX® processor. Preferably a given antenna used is configured to comprise a GPS receiver for determining the location position of the Earth station; and a compass and level finding device for determining tilt of the antenna in one or more directions. Suitably tilt is determined in a first and second direction wherein the first and second directions are substantially perpendicular to one another. Unit 601 is configured to receive information from a global positioning system (GPS) via a GPS receiver 304, identified for the antenna illustrated in FIG. 3. Earth station location position (comprising angles of terrestrial latitude and longitude, or equivalent co-ordinates with respect to the centre of the Earth and possibly the altitude of the Earth station above the Earth's surface) obtained by GPS receiver 304 is supplied to unit 601 via signal input 602. Altitude may be required for applications such as usage of a given Earth station in an aircraft in flight, for example. Similarly orientation determination means 305 supplies directional information with respect to true North via input connection 603 and also supplies information related to the tilt of antenna surface 301 in a first direction along input 604 and information relating to tilt in a second direction along input 605. Upon receiving the identified data via inputs 602 to 605, unit 601 is configured to effectively calculate the area of the sky in which the antenna is currently directed at. Upon obtaining the location position of the Earth station on the surface of the Earth (or in the case of an aircraft in relation to the Earth's surface and the height above the Earth's surface) and having determined the azimuth and elevation of the antenna, processing device 203 is configured to perform, for each satellite in the table, a table look up of tabulated satellite position data stored in table 606. The table look up, performed by antenna pointing processor unit 607, effectively comprises a first step of utilising the tabulated satellite position data to calculate the positions of said satellites in relation to the Earth station location position and a second step of selecting at least one of said satellites with which to establish communication.

The exact nature of the satellite position data stored may take a variety of formats. Geostationary orbits are by their very nature, configured to effectively render the position of a given satellite above the Earth's surface as constant with respect to the surface. However it is known that a small amount of drift may occur over a relatively substantial period of time. Thus for example over a year the position of the geostationary satellite above the earth's surface may drift by a small amount. Because of slight drifts in position of this type, as well as to deal with the planned launch of new satellites and/or the retirement of older satellites, the table of geostationary satellite position data is preferably updated once or twice a year for example so as to maintain accurate positioning data for effecting the required calculations for pointing a given antenna in a required direction. In the case of non-geostationary satellites drift may be more pronounced and thus the position data will be required to be updated relatively more frequently. In the case of an electronically stored look table the procedure for updating the data contained therein may be suitably implemented by for example updating a CD ROM wherein updated data is effectively downloaded from the CD ROM for use by processing device 203. An alternative would be for a satellite service provider to transmit to users via the telecommunications link 207, any planned satellite position changes (maneuvers as well as advising of the launch of new satellites which may be used for further communication services).

In response to the satellite selection and the obtained antenna azimuth and elevation, antenna pointing processor unit 607 is configured to determine a direction in which to configure the antenna for enabling it to communicate with the at least one selected satellite. In other words, processing device 103 is configured to determine a direction in which to point the antenna beam at one of the selected satellites. Following the table look up and the determination of the appropriate detection in which to point, the antenna pointing processor unit 607 is configured to effect pointing of the antenna radiation beam in the determined direction, eg by calculation of phase weights for the case of a patch antenna.

The derived direction of pointing is preferably optimized by selecting a satellite whose direction is likely to give a strong signal for the particular location position of the Earth station. Furthermore the direction may be further optimized by processor 606 calculating the distance of the identified satellites from the Earth station and thereafter selecting for example the closest satellite having a suitable line of sight. By a suitable line of sight it is meant a satellite which is not relatively quickly going to disappear over the celestial horizon.

In certain applications utilising configurations 2, 4 or 6 for example antenna pointing processor unit 607 may be configured to interact with user requirements via a user control interface 608. For example a given operator may require to communicate with a particular satellite or may require to further improve reception for example. Thus 607 may be configured for example to supply options of suitable satellites to communicate with to user control interface 608 via the communication link 609. Upon a given operator interacting with the presented options, the operator may instruct unit 607 to point at the preferred geostationary satellite, the selected information being supplied by communication link 610.

Whatever configuration is implemented for antenna pointing processor unit 607, the end result is transmission of signaling information by unit 607 to an antenna attached to processor unit 203 via communication link 611. Thus, in essence, the invention may be considered to comprise an Earth station having an antenna capable of transmitting and receiving a radiation beam. The Earth station is configured to store a table of satellite position data for a plurality of satellites and is also configured to obtain the location position of the Earth station and the azimuth and elevation of the antenna. The tabulated satellite position data is utilised to calculate the position of the satellite in relation to the obtained location position. Thereafter, the Earth station is suitably configured to select at least one of the satellites with which to establish communication and in response to the selection and the obtained azimuth and elevation, the station is configured to determine a direction in which to configure the antenna for operation with the at least one selected satellite. Upon determining the direction in which to configure the antenna, the antenna may be configured for operation in the direction. As identified, the location position and the azimuth and elevation of the antenna may be determined through the Earth station comprising a GPS receiver for establishing communication with a GPS satellite. The Earth station may be configured as a mobile, portable or fixed unit and the invention is configurable to enable communication to be established with geostationary satellites, non-geostationary satellites or a combination of both geostationary and non-geostationary satellites. For embodiments enabling communication to be established with nongeostationary satellites, communication may be established with the first non-geostationary satellite wherein the Earth station is additionally configured to a powerful establishing communication with a second satellite so as to avoid a communication breakdown due to the first non-geostationary satellite passing over the horizon. In the case of a fixed Earth station (type category 5 or 6), the means of obtaining the location position of the Earth station may simply comprise the given Earth station being configured with pre-stored data regarding its location position, and in the required calculations for establishing a direction in which to point the antenna, the location position will require to be obtained from an electronic memory for example. The invention may also be construed as a satellite telecommunications link for facilitating communication with an Earth station having an antenna, the link being configured in accordance with the Earth station performing the aforementioned steps.

FIG. 7 schematically illustrates a suitable look up table of the type identified in FIG. 6, the table effectively comprising an almanac of satellite orbital parameter data. The table shown in FIG. 7 represents orbital parameter data stored for non-geostationary satellites, such as non-geostationary satellites having ID numbers 0001, 0002 and N as identified in table fields 701, 702 and 703 respectively. In the embodiment detailed the data held in relation to each satellite is identified by the appropriate ID number and comprises nine fields. The orbital parameters held for each non-geostationary satellite are identical. Thus in relation to satellite ID number 0001 as identified in box 701, the stored orbital parameters comprise the following.

Field 704 stores a check number representing the health of the satellite at the time of transmission of the almanac data. A health value of 000 may represent the fact that the satellite having ID number 0001 was in fact in good working order at the time of the transmission. A different health value, such as for example the value 111, may be used to indicate that the satellite was not in suitable working order at the time of the transmission of the almanac data. The health field may thus be used to indicate the reliability of the data.

Field 705 comprises a time stamp parameter known as the time of applicability of the almanac data (TOA). 'TOA' may be considered to be the time that the almanac data was actually created and thus it is measured in seconds from an arbitrary date and time. In the present example the value of 'TOA' in field 705 is 61440.0000. Field 706 comprises data representing the satellite orbital parameter known as the eccentricity (e) which in the present example has the value 3.5567283630E–003 where the 'E' notation "E–003" represents to the power of minus 3. Field 707 comprises the satellite orbital parameter known as the inclination of the orbit (i) which in the present example has the value 0.9547017813 radians. Field 708 holds the value of the orbital parameter known as the rate of right ascension ($\Omega_{(dot)}$), measured in radians per second. In the present example ($\Omega_{(dot)}$) has the value –7.9317592494E–009. Fields 709 holds a value related to the orbital parameter known as the semi-major axis (A) wherein the actual value stored represents the square root of A., in the present example this having the value 5153.572754. Field 710 comprises a quantity known as the right ascension at the time of applicability ($\Omega_{TOA}$) measured in radians. In the present example the value of the right ascension at the time of applicability is −2.9067027569E+000. Field 711 comprises a data value known as the argument of perigee ($\omega$) which is otherwise known as the argument of the perihelion, the unit being radians. In the particular example shown the value of $\omega$ is −1.484642506. Finally field 712 comprises the orbital parameter known as the mean anomaly $m_{(0)}$ for the given satellite orbit. In the present example the value of the mean anomaly is −7.0817857981E−001.

A suitable satellite almanac of the type identified in FIG. 7 may be comprised solely of non-geostationary satellite data or alternatively may comprise a mixture of non-geostationary satellite orbital data and geostationary satellite data. For Earth station embodiments configurable to establish communication with geostationary satellites, such as those identified in FIG. 1 as categories 2, 4, and 6, the almanac data is much simplified and in fact in terms of the orbital parameters stored comprises only the right ascension at the time of applicability, $\Omega_{(TOA)}$, this being known simply as the longitude in the case of a geostationary orbit. This follows because for a geostationary satellite the orbit is circular and thus has an excentricity of 0 and a mean anomaly of 0. Furthermore, by definition the orbital radius for geostationary orbits is a constant having the same value of 42242 km for all geostationary satellites. Similarly, for a geostationary orbit the inclination (i) is 0 as is the rate of right ascension. Additionally the time of applicability is stored for the case of a geostationary satellite.

Figure 8:
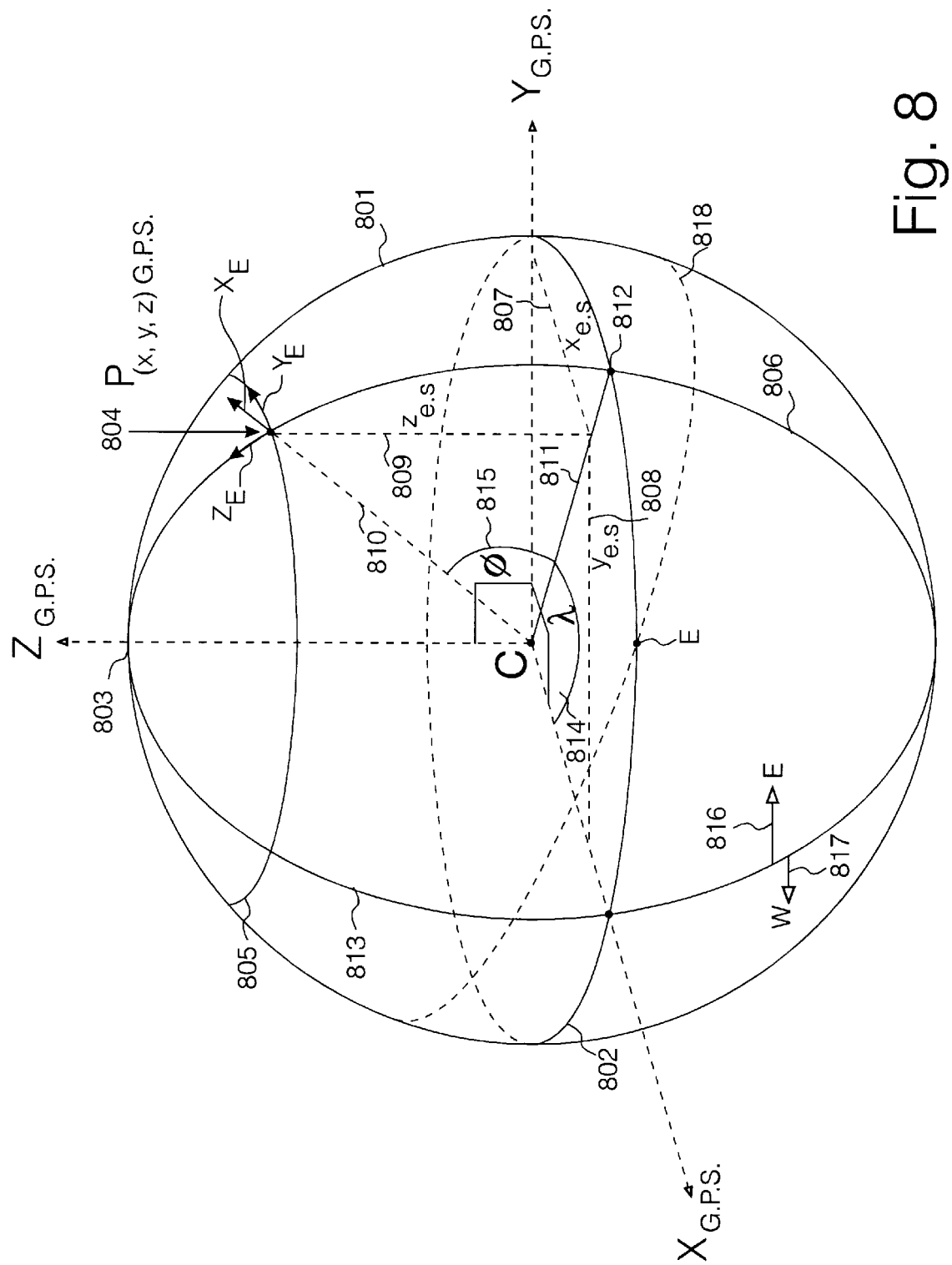
FIG. 8 schematically illustrates the angles of latitude and longitude of an Earth station in relation to the centre of the Earth.

FIG. 8 schematically illustrates the angles of terrestrial latitude ($\emptyset$) and terrestrial longitude ($\lambda$) of an Earth station P. The surface of the Earth is represented by sphere 801 centred about the centre of the Earth (C). The rectangular system of X,Y,Z co-ordinates, representing a GPS co-ordinate system, has its origin at the centre of the Earth, the X,Y plane lying in the equatorial plane 802 of the Earth. In FIG. 8 the equatorial plane 802 is identified as a horizontal great circle and the GPS Z axis is perpendicular to this plane being positive in the vertical direction and passing through the North Pole 803. The position, $P(X,Y,Z)_{GPS}$ of the Earth station on the Earth's surface at 804 is seen to lie on a line of constant latitude 805. Similarly, point P lies on a line of constant longitude 806. The geocentric X,Y and Z co-ordinates of point P are respectively indicated by the broken line constructions 807 ($X_{es}$), 808 ($Y_{es}$) and 809 ($Z_{es}$) respectively. The broken line constructions 807 to 809 are established by the drawing of a straight line between point C and point P (diagonal 810) and the drawing of line 811 between point C and the point of intersection 812 of the great circle 806 with the equator 802. The X axis of the GPS co-ordinate system is configured to pass through the Greenwich Meridian 813 which is alternatively known as the Prime Meridian.

For the point P, the terrestrial longitude 814 ($\lambda$), is thus the angle between the C−X axis and line construction 811. Terrestrial longitude may be measured either from 0 to 180° East of the Greenwich meridian or 0 to 180° West of the Greenwich meridian, as indicated by arrows 816 and 817 respectively. Similarly the terrestrial latitude ($\emptyset$) of point P is defined as the angle between line construction 810 and the X -Y plane. The terrestrial latitude and longitude may be identified as either angles as described or as the appropriate corresponding arcs on surface 801. Thus the terrestrial latitude 815 of point P may be represented as either angle 815 or the arc between point 804 (P) and 812. For completeness in the figure, the horizon, great circle 818, is also illustrated by a broken line, this circle being parallel to the observers horizontal plane.

A second co-ordinate system ($X_E$, $Y_E$, $Z_E$) is also illustrated, centred at Earth station P and thus representing a local co-ordinate frame with respect to the Earth station. The $Z_E$ axis points North to point 803 (a tangent to great circle 806), the $Y_E$ axis points East (a tangent to circle 805) and the $X_E$ axis points upwards (that is, in a direction normal to the horizon).

Figure 9:
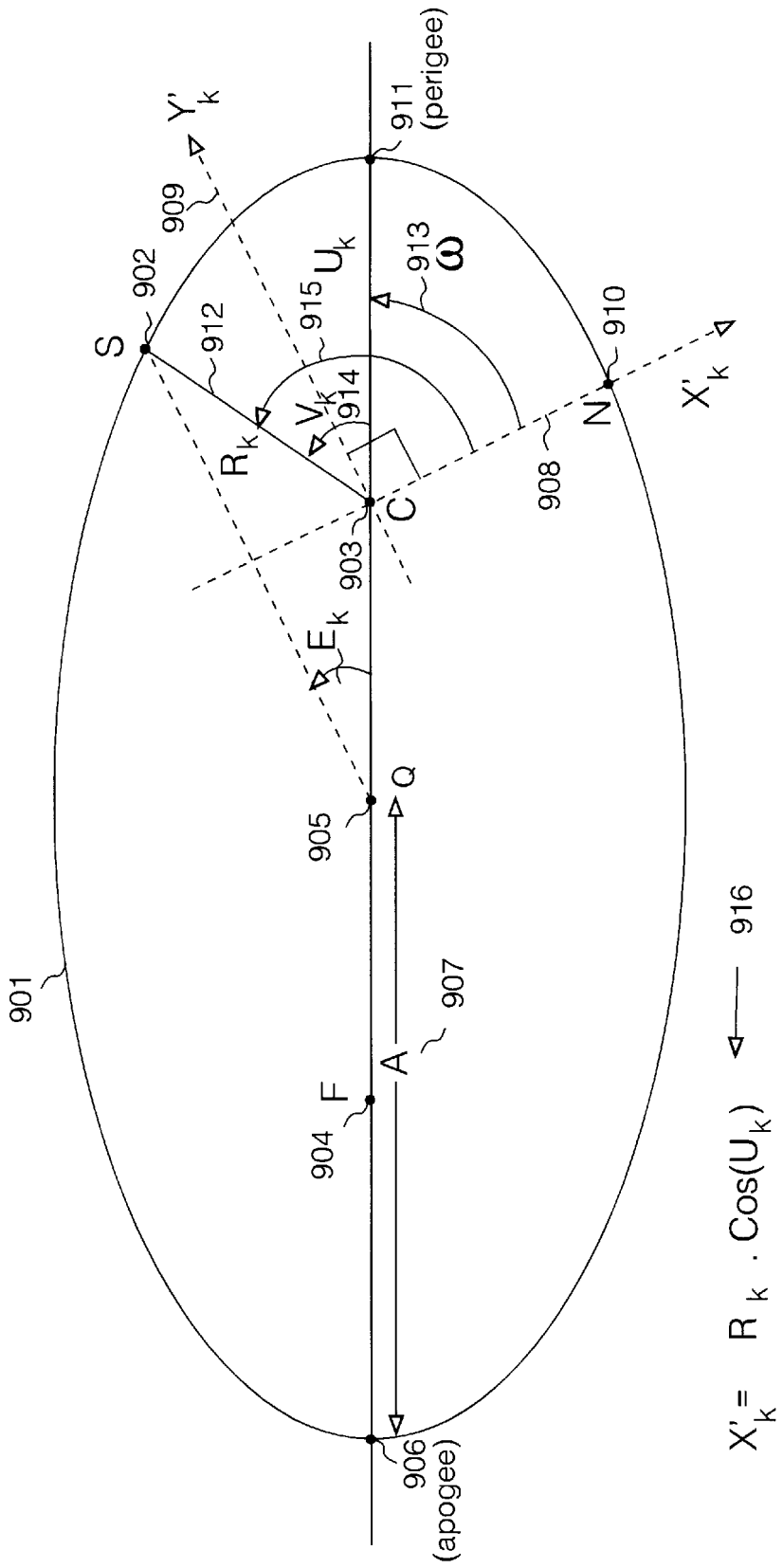
FIG. 9 schematically illustrates orbital parameters of concern to the present invention for a non-geostationary elliptical satellite orbit and in particular identifies angles of true anomaly and eccentric anomaly.
Figure 10:
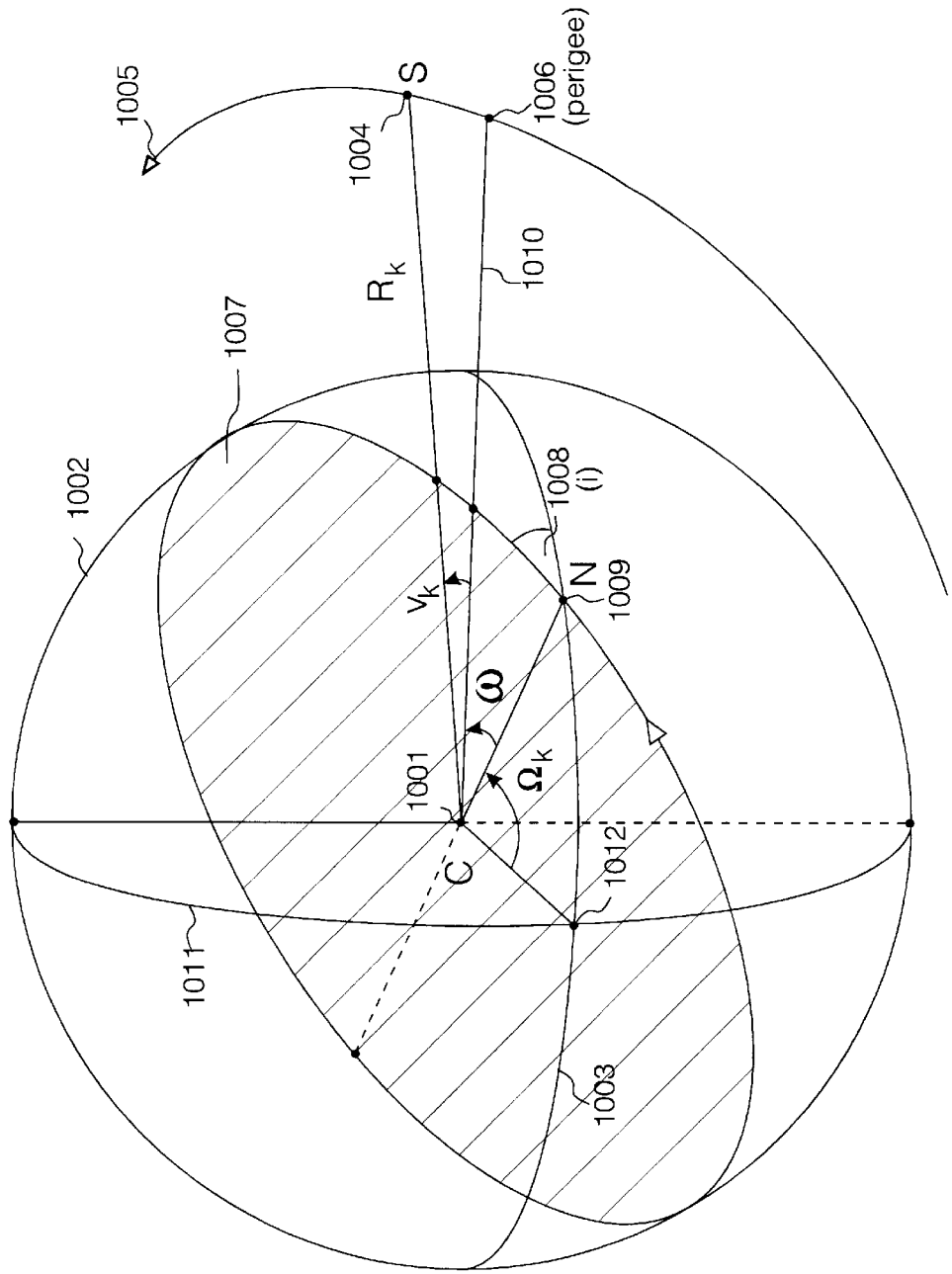
FIG. 10 schematically illustrates the position of the satellite orbital plane in relation to the terrestrial equator and in particular identifies the angle of right ascension for the satellite.

The orbital parameters introduced in FIG. 7 are further defined in FIGS. 9 and 10. FIG. 9 schematically illustrates the elliptical orbital plane 901 of an artificial satellite (S) 902. The ellipse 901 comprises a first focal point 903, occupied by the centre of the Earth (C), and an unoccupied focal point (F) 904. Point 905 is the central point (Q) of the ellipse and point 906 (apogee) is the point in the satellites orbit furthest from the centre of the Earth. The distance 907 between point 905 and apogee is known as the semi-major axis (A) of the ellipse. Rectangular Cartesian co-ordinates of the ellipse may be represented by a first broken line axis 908, labelled $x'_k$ and an axis perpendicular to axis 908 represented by broken line axis 909 and labelled $y'_k$. The $x'_k$ axis, 908 may be defined as the line between the centre of the Earth 903 and the ascending node (N) 910. A further point known as the point of perigee (or perihelion), 911 is the nearest point of the satellite in its orbit to the centre of the Earth 903. Line 912 adjoining the centre of the Earth 903 and the current satellite position 902, represents the distance ($R_k$) of the satellite from the centre of the Earth.

Various astronomical definitions now follow. Angle 913 is known as the argument of perigee (w) and this is the angle between broken line 908 and the line drawn between point 903 and perigee. The eccentric anomaly ($E_k$) is the angle between a line adjoining points 902 and 905 and the line adjoining points 905 and perigee. The true anomaly ($V_k$) 914 is the angle between a line adjoining points C and perigee and the radius vector $R_k$. Finally, the sum 915 of angles $\omega$ and $V_k$ is known as the argument of the latitude of the satellite ($U_k$). From FIG. 9, the polar co-ordinates of the ellipse may be defined by relationships 916 and 917 which are respectively:

$x'_k = R_k \cos(U_k) \ldots$ 916

$y'_k = R_k \sin(U_k) \ldots$ 917

The ratio of the distance between points Q and C and the distance between points Q and perigee is known as the eccentricity of the ellipse (e), this relationship being indicated at 918 as (e A)/A..

For the precise location of a satellite to be calculated in terms of axes defining its orbital plane, a further parameter is required which is known as the mean anomaly ($m_o$). The orbital period of the satellite (T) is the time taken for the radius vector, $R_k$ to sweep out an angle of 360° ($2\pi$ radians). If we let $N_o$ denote the average rate of description of angle by radius vector $R_k$ then:

$N_o = 2\pi/T$ where: $N_o$ is called the mean angular motion of the satellite.

Denoting the time at which the satellite passed through perigee as $\tau$ and noting that the position of the satellite at a later time t is point 902 (ie, motion of satellite is anti-clockwise in FIG. 9) then the mean anomaly is defined by $m_o = N_o(t-\tau)$.

FIG. 10 schematically illustrates various orbital parameters of a satellite orbit including the inclination of the orbital plane of the satellite S with respect to the Earth's equator. The centre of the Earth (C) is identified as point 1001 and the surface of the Earth is identified as the surface of sphere 1002. The Earth's equator 1003 is substantially horizontal in FIG. 10. The satellite (S) is indicated at position 1004 external to the Earth's surface 1002. The motion of the satellite in its orbit is indicated by arrow 1005, the satellite having passed through perigee at point 1006. The orbital plane of the satellite within surface 1002 is indicated by great circle 1007 which is inclined to the equatorial plane 1003 by the angle of inclination (i), indicated at 1008. An extrapolation of the Earth's equatorial plane 1003 into space would give rise to intersection of the equatorial plane with the surface of the celestial sphere (not shown) wherein the point of intersection of the equatorial plane and the satellite orbital plane is known as a node. In this context, the surface of the Earth 1002 may be considered to represent the celestial sphere and thus point 1009 (N) may be considered to represent the ascending node of the satellite orbit. The radius vector ($R_k$) is represented by the line adjoining points 1001 and 1004. The angle between line 1010 (the straight line drawn between points 1001 and perigee) and the radius vector $R_k$ is the true anomaly $V_k$. The angle between the line adjoining point C and N and line 1010 is the argument of perigee (ω). The point of intersection of the Greenwich meridian 1011 and the equator 1003, that is point 1012, is used as a reference point from which to measure an angle or arc to ascending node N. The angle or arc ($\Omega_k$) between points 1012 and 1009 is known as the longitude of the ascending node (otherwise known as the right ascension) of the satellite in its orbit. Thus the six orbital parameters required to determine the position of the satellite in its orbit have been identified as follows: the semi major axis (A), eccentricity (e), the time (τ) at which the satellite passes through perigee, longitude of the ascending node ($\Omega_k$), inclination of the orbital plane (i) and the argument of perigee (ω).

Figure 11:
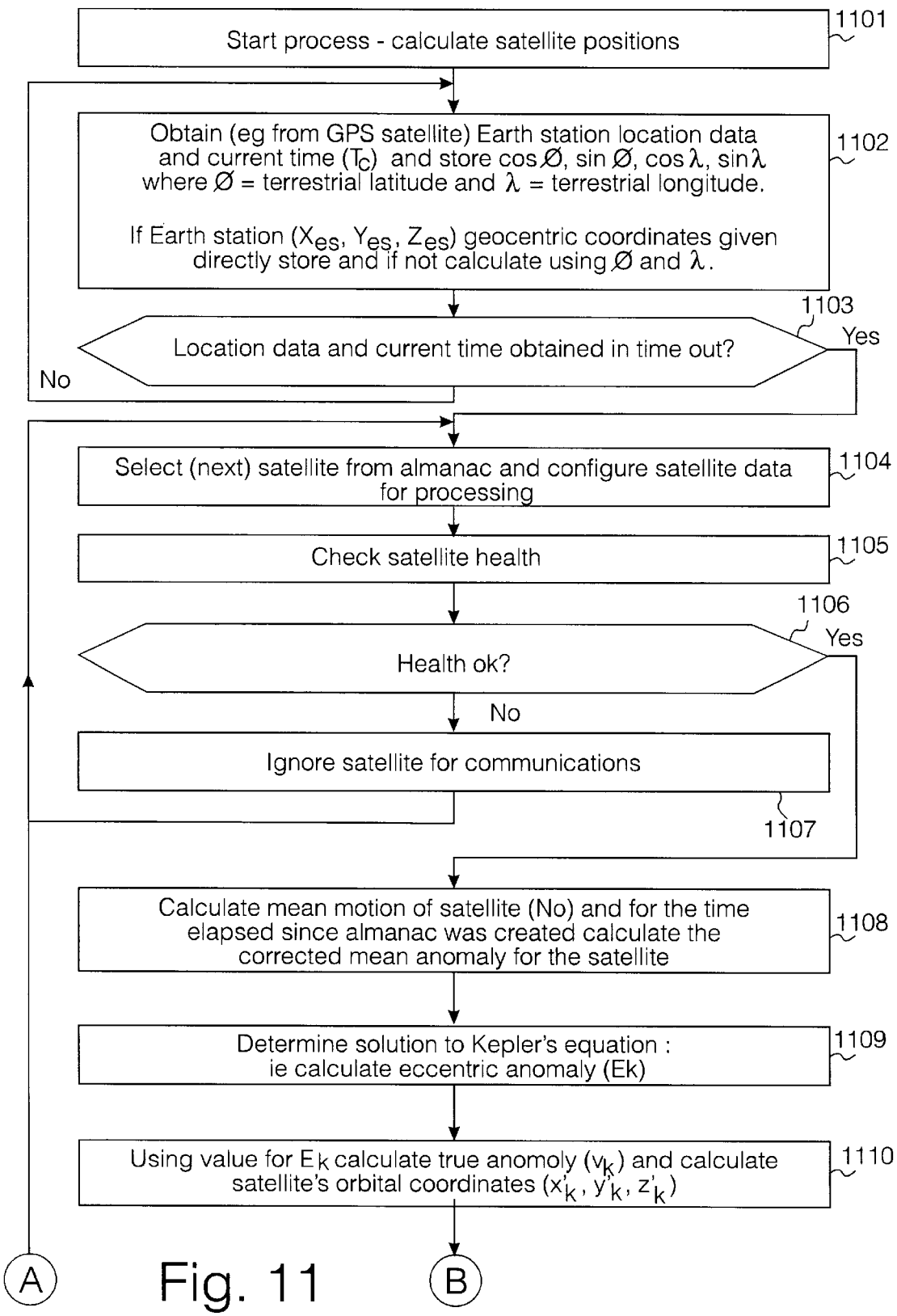
FIG. 11 details the steps involved in calculating the angle of azimuth, the angle of elevation and the range of a given non-geostationary satellite and comprises the steps of calculating the mean motion and mean anomaly for the satellite, calculating the eccentric anomaly, calculating the true anomaly, calculating the geocentric equatorial co-ordinates of the satellite, calculating the position of the satellite in relation to the Earth station, calculating the angle of azimuth and calculating the angle of elevation on the range of the satellite.
Figure 11:
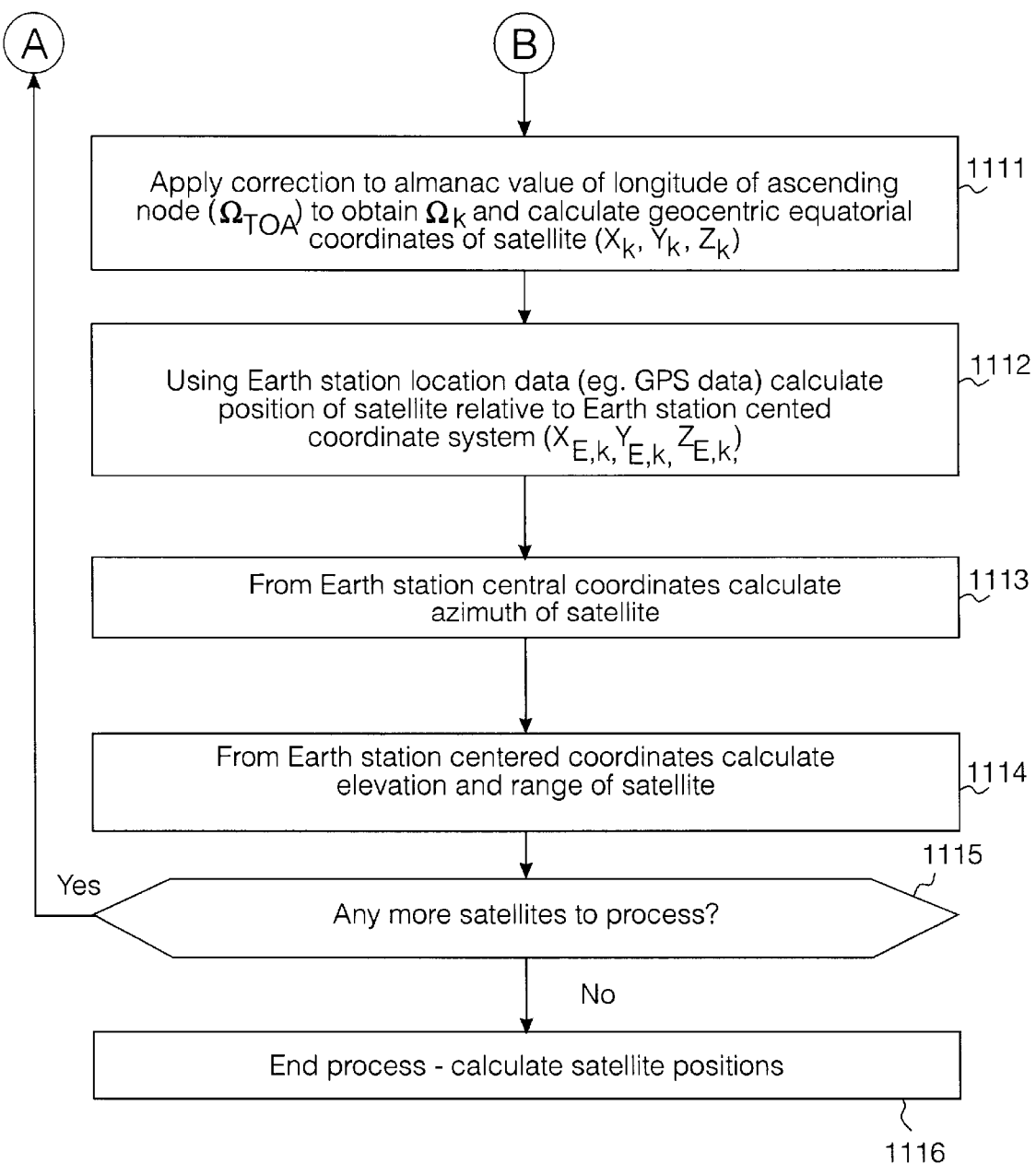

FIG. 11 details the steps performed by processor 203 in calculating the positions of a plurality of satellites, each having orbital data stored in look up table 606. The steps identified in FIG. 11 are applicable to the less trivial case of non-geostationary satellite positions and these steps are substantially similar for any of the Earth station—satellite systems identified as category 1, 3 or identified in FIG. 1. The steps identified are substantially directly applicable to the case of a portable Earth station communicating with non-geostationary satellites (category 3) or to a category system. With minor modifications to compensate for movement of the given Earth station during communication with a non-geostationary satellite the steps are also substantially applicable to communication with a mobile Earth station of category 1 type.

At step 1101 the Earth station processor 203 is configured to start the process 'calculate satellite positions'. Following step 1101, at step 1102 the Earth station is configured to obtain Earth station location data along with the current time ($T_c$). the Earth station location data may be obtained from a GPS satellite for example, and the Earth station is configured to store the cosine of the latitude, the sine of the latitude, the cosine of the longitude and the sine of the longitude, wherein said latitude and longitude are the terrestrial angles of latitude and longitude respectively. In the preferred embodiment, the geocentric co-ordinates of the Earth station ($X_{es}$, $Y_{es}$, $Z_{es}$) are also obtained directly from a GPS satellite and stored by the Earth station. However, if the particular embodiment of the Earth station GPS satellite does not facilitate obtaining the geocentric co-ordinates from the extend source then processor 203 may be configured to calculate these quantities from the obtained angles of latitude and longitude. Following step 1102 a question is asked at step 1103 as to whether the location data and the current time have been obtained in a given time out. This question particularly relates to the case where the location data and current time are obtained from remote source such as a GPS satellite. If the question asked at step 1103 is answered in the negative then control is returned to step 1102 until the said location data and current time are obtained. Upon the Earth station location data and current time being obtained, the question asked at step 1103 is answered in the affirmative and control is passed to step 1104. At step 1104 the next satellite from the almanac (the lookup table 606 detailed in FIG. 7) is selected and the almanac data for the selected satellite is effectively configured to enable it to be processed by processor 203. If at step 1104 the next satellite to be selected is in fact the first satellite to be processed then this step is effectively configured to select the first satellite from the satellite look up table. Following step 1104, at step 1105 the satellite health is checked via processor 203 being configured to read and determine the status of the value held in the appropriate health field for the satellite as identified in FIG. 7. Following step 1105, at step 1106 a question is asked as to whether the health of the satellite data is considered reliable for use in processing. If this question is answered in the negative then the satellite data record selected at step 1104 is effectively ignored at step 1107 and control is returned to step 1104 wherein the next satellite is selected. Upon the question asked at step 1106 being answered in the affirmative then control is passed to step 1108 wherein the mean motion of the satellite ($N_o$) is calculated. Additionally at step 1108, for the time elapsed since the almanac was created, the mean anomaly for the satellite is calculated. Following step 1108 control is directed to step 1109 wherein Kepler's equation for the selected satellite orbit is solved by an iterative technique to yield the eccentric anomaly ($E_k$). Kepler's equation simply states that the mean anomaly is equal to the eccentric anomaly minus the eccentricity of the satellite orbit multiplied by the sine of the eccentric anomaly. Following step 1109 control is passed to step 1110 wherein the calculated value for the eccentric anomaly is utilised to calculate the true anomaly ($V_k$) whereafter the satellite's orbital co-ordinates ($x'_k$, $y'_k$, $z'_k$) are derived. Following step 1110, at step 1111 a correction is applied to the value of the longitude of the ascending node ($\Omega_{TOA}$), the original value being obtained from the look up table as identified in FIG. 7. The required corrected value of $\Omega_{TOA}$ is $\Omega_k$ corresponding to the time lapsed since the almanac was created. Following the determination of $\Omega_k$ the geocentric equatorial co-ordinates of the satellite ($X_k$, $Y_k$, $Z_k$) are calculated . Following step 1111, at step 1112 the Earth station location data obtained at step 1102 is used to calculate the position of the satellite relative to a new co-ordinate system whose origin is at the Earth station. Thus, Earth station centred co-ordinates of the satellite ($X_{EK}$, $Y_{EK}$, $Z_{EK}$) are established. Following step 1112, at step 1113 the Earth station centred co-ordinates of the satellite are utilised to calculate the angle of azimuth of the satellite, which is stored electronically for subsequent use, and similarly following step 1113, at step 1114, the Earth station centred co-ordinates are utilised to calculate the angle of elevation of the satellite and the true range of the satellite from the Earth station, both of which are electronically stored for subsequent use. Following step 1114 a question is asked at step 1115 as to whether there are any more satellites in the look up table to be processed. If the question asked at step 1115 is answered in the affirmative, to the effect that there are further satellites in the satellite look up table to be processed, then control is returned to step 1104 and steps 1104 to 1115 are repeated. However if the question asked at step 1115 is answered in the negative then all the satellites whose data is stored in the look up table are deemed to have been processed and the process 'calculate satellite positions' is effectively terminated at step 1116.

Figure 12:
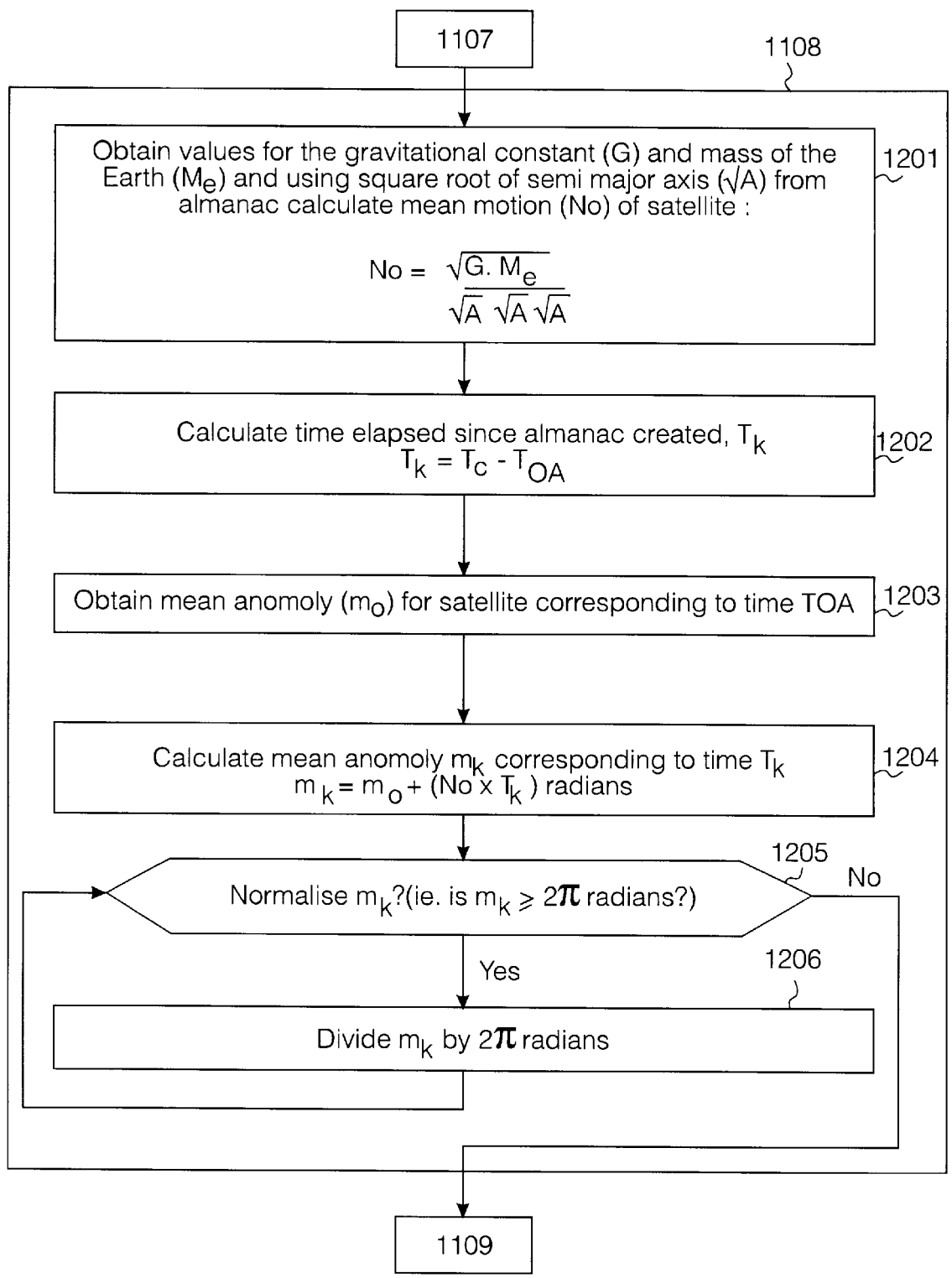
FIG. 12 further details the step of calculating the mean motion and mean anomaly of the satellite as identified in FIG. 11.

FIG. 12 further details step 1108 in FIG. 11 relating to calculation of the mean motion of the satellite and the mean anomaly. At step 1201 the Earth station processor 203 is configured to obtain values for the gravitational constant (G) and the mass of the Earth ($M_e$) whereafter utilising the square root of the semi-major axis stored in the satellite look-up table (as identified in FIG. 7), the mean motion of the non-geostationary satellite ($N_o$) is calculated. $N_o$ is calculated by determining a divisor derived from the square root of the semi-major axis cubed.

The product $G.M_e$ is calculated and the squareroot taken whereafter this quantity is divided by the aforementioned divisor to give the mean motion of the satellite in radians per second. Following step 1201 the time elapsed since the almanac of satellite data was created ($T_k$) is calculated by subtracting TOA from the current time ($T_c$), this latter quantity having being obtained by the Earth station at step 1102 in FIG. 11. Following step 1202, at step 1203 the mean anomaly ($m_o$) for the satellite under consideration corresponding to time TOA is obtained from the look-up table. Having obtained the mean anomaly at step 1203, at step 1204 the mean anomaly ($m_k$) corresponding to time $T_k$ is calculated in accordance with the expression:

$$m_k = m_o + (N_o.T_k) \text{ radians}$$

Following step 1204 a question is asked at step 1205 as to whether the value $m_k$ requires normalization. This question relates to whether the value for $m_k$ is greater than or equal to $2\pi$ radians. If the question asked at step 1205 is answered in the affirmative then control is passed to step 1206 wherein the value for $m_k$ is effectively divided by $2\pi$ radians with control being returned to step 1205 thereafter. However if the question asked at step 1205 is answered in the negative to the effect that the $m_k$ does not require normalization then control is passed to step 1109 in FIG. 11.

Figure 13:
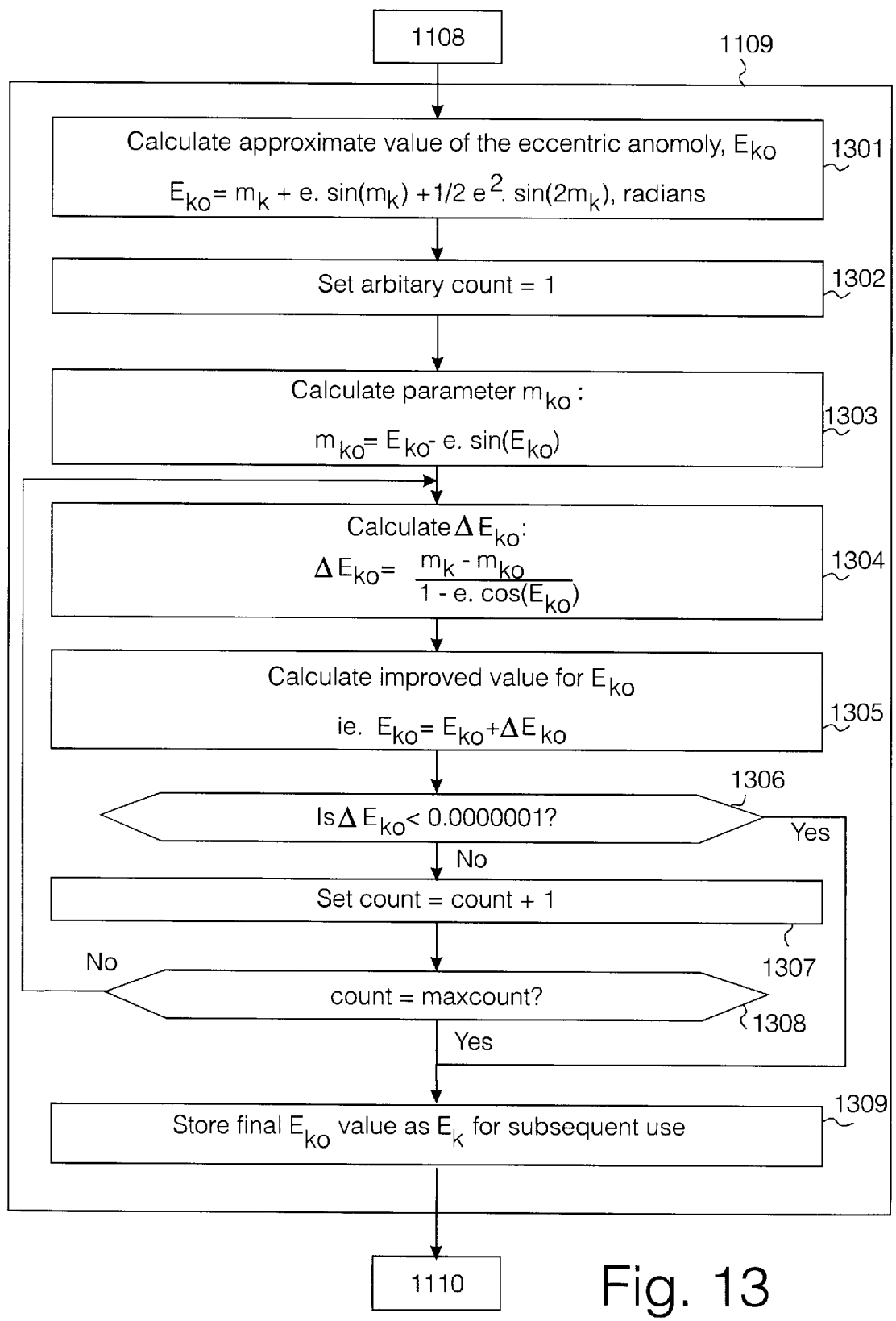
FIG. 13 details the step of calculating the eccentric anomaly as identified in FIG. 11.

Step 1109 relating to determining the solution to Kepler's equation for the satellite under consideration is detailed in FIG. 13. Thus, following step 1108 control is passed to step 1301 wherein the approximate value of the eccentric anomaly ($E_{ko}$) is calculated in accordance with the following equation:

$$E_{ko} = m_k + e \cdot \sin(m_k) + \tfrac{1}{2} e^2 \cdot \sin(2 m_k), \text{ radians}$$

The value of $E_{ko}$ calculated at step 1301 represents an initial approximation to the eccentric anomaly which is thereafter improved via an iterative process as follows. Following step 1301, at step 1302 an arbitrary count, representing the current iteration in the calculation of the eccentric anomaly, is set equal to the value one corresponding to the fact that the first iteration is to be undertaken. Following step 1302 control is passed to step 1303 wherein a parameter ($m_{ko}$) is calculated in accordance with the following equation:

$$m_{ko} = E_{ko} - e \cdot \sin(E_{ko})$$

Following step 1303 control is passed to step 1304 wherein a further quantity ($\Delta E_{ko}$) is calculated in accordance with the following equation:

$$\Delta E_{ko} = \frac{M_k - M_{ko}}{1 - e \cdot \text{Cos}(E_{ko})}$$

Following step 1304 an improved value for the eccentric anomaly is calculated, the improved value being given by the sum of $E_{Ko}$ derived at step 1301 and $\Delta E_{ko}$ derived at step 1304. Thus the applicable equation for performing step 1305 is as follows:

$$E_{ko} := E_{ko} + \Delta E_{ko}$$

where the operator ':=' may be taken to mean 'is set equal to'.

Following step 1305 a question is asked at step 1306 as to whether the quantity $\Delta E_{ko}$, calculated at step 1304, is less than an arbitrarily chosen constant (in FIG. 13 the value of this constant is 0.0000001). The question asked at step 1306 provides for efficiency in that it is configured to prevent further iterations if the value of the quantity $\Delta E_{ko}$ in the current iteration is determined to be of negligible magnitude. If the question asked at step 1306 is answered in the negative then the arbitrary count set at step 1302 is incremented at step 1307. Following step 1307 control is passed to step 1308 wherein a further question is asked as to whether the arbitrary count incremented at step 1307 is equal to an arbitrary value representing the maximum count. The question asked at step 1308 thus corresponds to determining whether an arbitrary maximum number of iterations has been performed. If the question asked at step 1308 is answered in the negative then control is returned to step 1304 wherein steps 1304 to 1306 are repeated (as are steps 1307 and 1308 depending on the outcome of the question asked at step 1306). The repeating of steps 1304 to 1308 yields a value for $E_{ko}$ in step 1305 which is a closer approximation to the true value of the eccentric anomaly as compared with the value determined in the previous iteration. The process is terminated by the question asked at step 1306 being answered in the affirmative or alternatively the question asked at step 1308 being answered in the affirmative. Following either step 1306 or step 1308 being answered in the affirmative then control is passed to step 1309 wherein the final optimised value for the eccentric anomaly, ($E_k$) is stored at step 1309.

Figure 14:
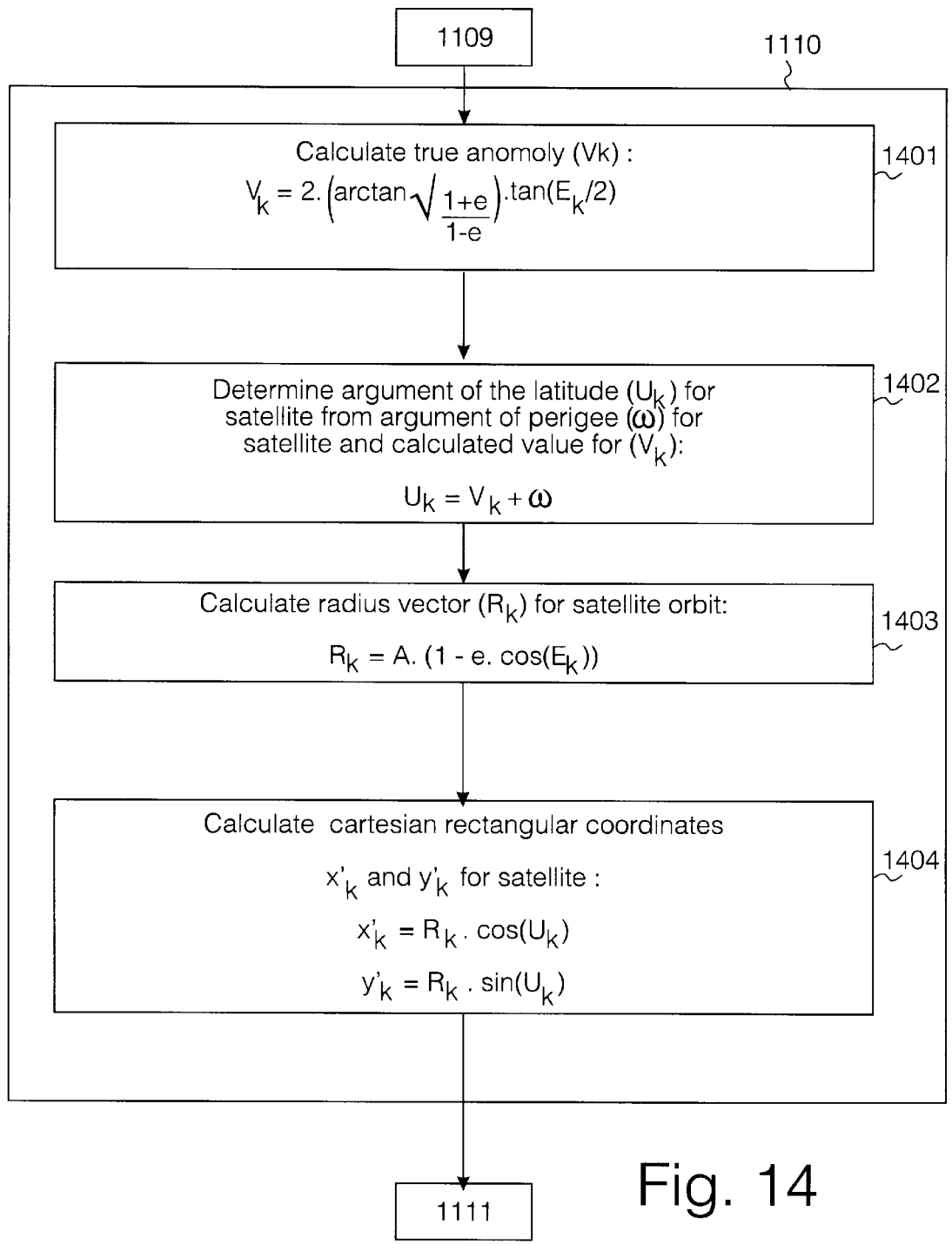
FIG. 14 further details the step identified in FIG. 11 relating to calculation of the true anomaly.

The optimised value of the eccentric anomaly may now be utilised to calculate the true anomaly ($V_k$), identified in FIGS. 9 and 10, which in turn enables the Cartesian rectangular co-ordinates of the position of the satellite in its elliptical orbit to be derived, this step being detailed in FIG. 14.

At step 1401 the true anomaly ($V_k$), is calculated in accordance with the following equation:

$$V_k = 2 \cdot \arctan\left(\sqrt{((1+e)/(1-e))}\right) \cdot \tan(E_k / 2)$$

Following step 1401, at step 1402 the angle known as the argument of the latitude ($U_k$) for the satellite is determined. $U_k$ is identified in FIG. 9 where it is seen that it is given by the sum of the calculated value for $V_k$ and the argument of perigee ($\omega$).

Following step 1402, at step 1403 the radius vector ($R_k$) for the satellite orbit is calculated in accordance with the following equation:

$$R_k = A \cdot (1 - e \cdot \cos(E_k))$$

where, for the latter two equations, e is the eccentricity of the satellite orbit. Having calculated the value of $U_k$ and $R_k$, control is passed to step 1404 wherein the Cartesian rectangular co-ordinates of the satellite in its elliptical orbit are calculated. These co-ordinates are identified in FIG. 9 as $x'_k$ and $y'_k$ which are perpendicular to each other in the plane of the satellite orbit and wherein the $x'_k$ axis is effectively defined as passing through both the centre of the Earth and the ascending node (N). The $x'_k$ axis is also identifiable in FIG. 10 wherein it is seen to be the line adjoining points 1001 (representing the centre of the Earth) and point 1009. The Cartesian rectangular co-ordinates of the satellite in its elliptical orbit are calculated in accordance with the following equations:

$$x'_k = R_k \cdot \cos(U_k)$$

$$y'_k = R_k \cdot \sin(U_k)$$

Figure 15:
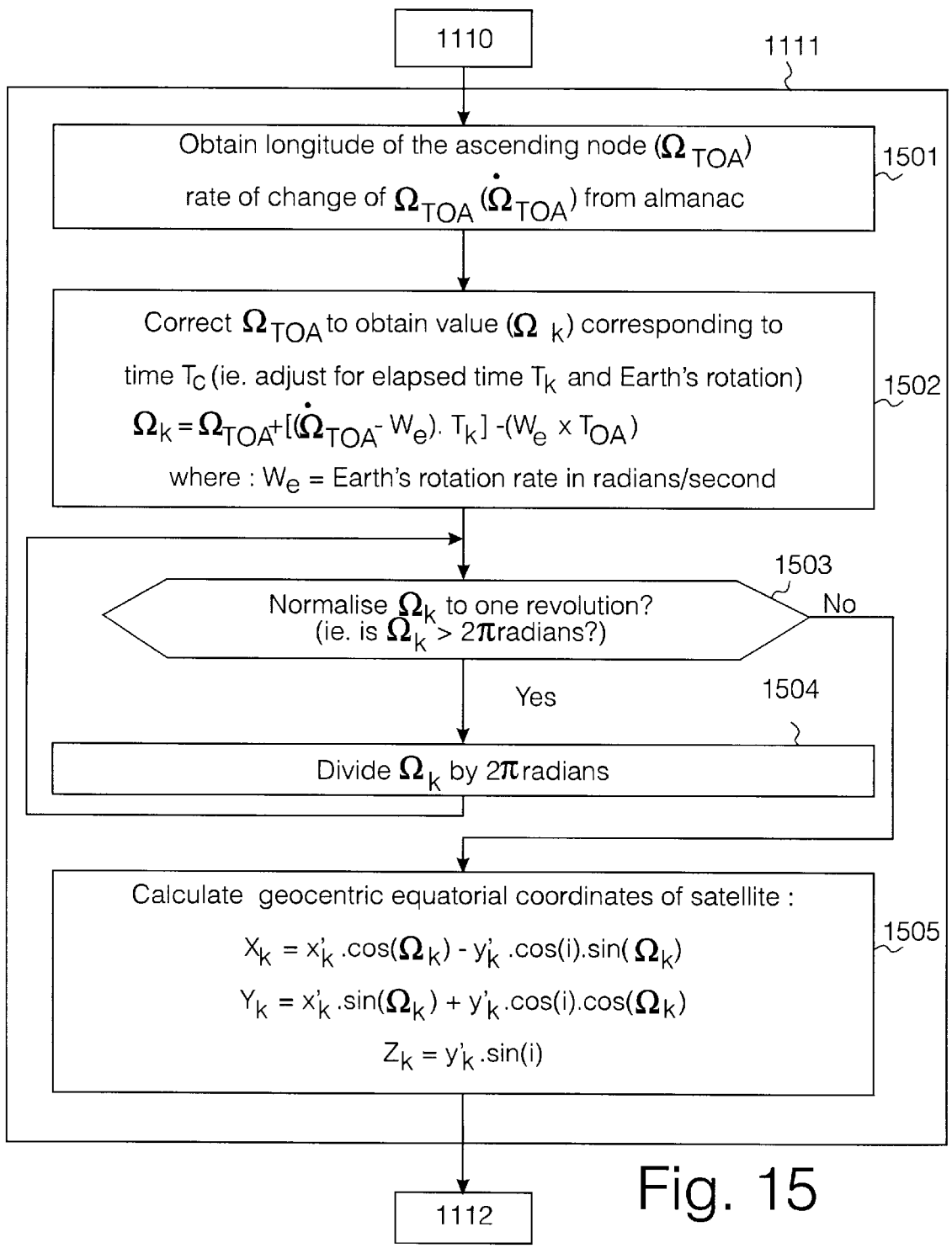
FIG. 15 further details the step in FIG. 11 relating to calculation of the geocentric equatorial co-ordinates of a satellite.

Following step 1110 of FIG. 11, the Earth station processor 203 is required to calculate the geocentric equatorial co-ordinates of the satellite as identified at step 1111 which is further detailed in FIG. 15. Thus, at step 1501 the Earth station is configured to obtain the longitude of the ascending node ($\Omega_{TOA}$) and the rate of change of the ascending node ($\Omega_{dot\ TOA}$)) from the satellite look-up table 606. Following step 1501 control is passed to step 1502 wherein the stored value for the ascending node angle is required to be corrected so as to obtain the value of the ascending node angle corresponding to the present time, $T_c$. In other words, the ascending node angle is required to be adjusted so as to account for the elapsed time, $T_k$ and the Earth's rotation. The value of $\Omega_k$ is obtained from the following equation:

$$\Omega_k = \Omega_{TOA} + [(\Omega_{dot\ TOA} - W_e) \cdot T_k] - (W_e \times T_{OA})$$

where: $W_e$=Earth's rotation rate in radians/second.

Following step 1502, control is passed to step to 1503 where a question is asked as to whether the calculated value of $\Omega_k$ is required to be normalized to one revolution (ie, so that it relates to an angle between zero radians and $2\pi$ radians). In other words, question 1503 corresponds to whether the calculated value of $\Omega_k$ is greater than or equal to $2\pi$ radians. If the question asked at step 1503 is answered in the affirmative then control is passed to step 1504 wherein $\Omega_k$ is effectively divided by $2\pi$ radians. Following step 1504 control is returned to step 1503 wherein the normalization question is asked again. Steps 1503 and 1504 are repeated until the question asked at step 1503 is answered in the negative to the effect that a value for $\Omega_k$ has been obtained which lies within the range of 0 to $2\pi$ radians. Upon the question asked at step 1503 being answered in the negative control is directed to step 1505 wherein the Earth station processor 203 is configured to calculate the geocentric equatorial co-ordinates ($X_k$, $Y_k$, $Z_k$) in accordance with the following equations:

$$X_k = x'_k \cdot \cos(\Omega_k) - y'_k \cdot \cos(i) \cdot \sin(\Omega_k)$$

$$Y_k = x'_k \cdot \sin(\Omega_k) + y'_k \cdot \cos(i) \cdot \cos(\Omega_k)$$

$$Z_k = y'_k \cdot \sin(i)$$

Figure 16:
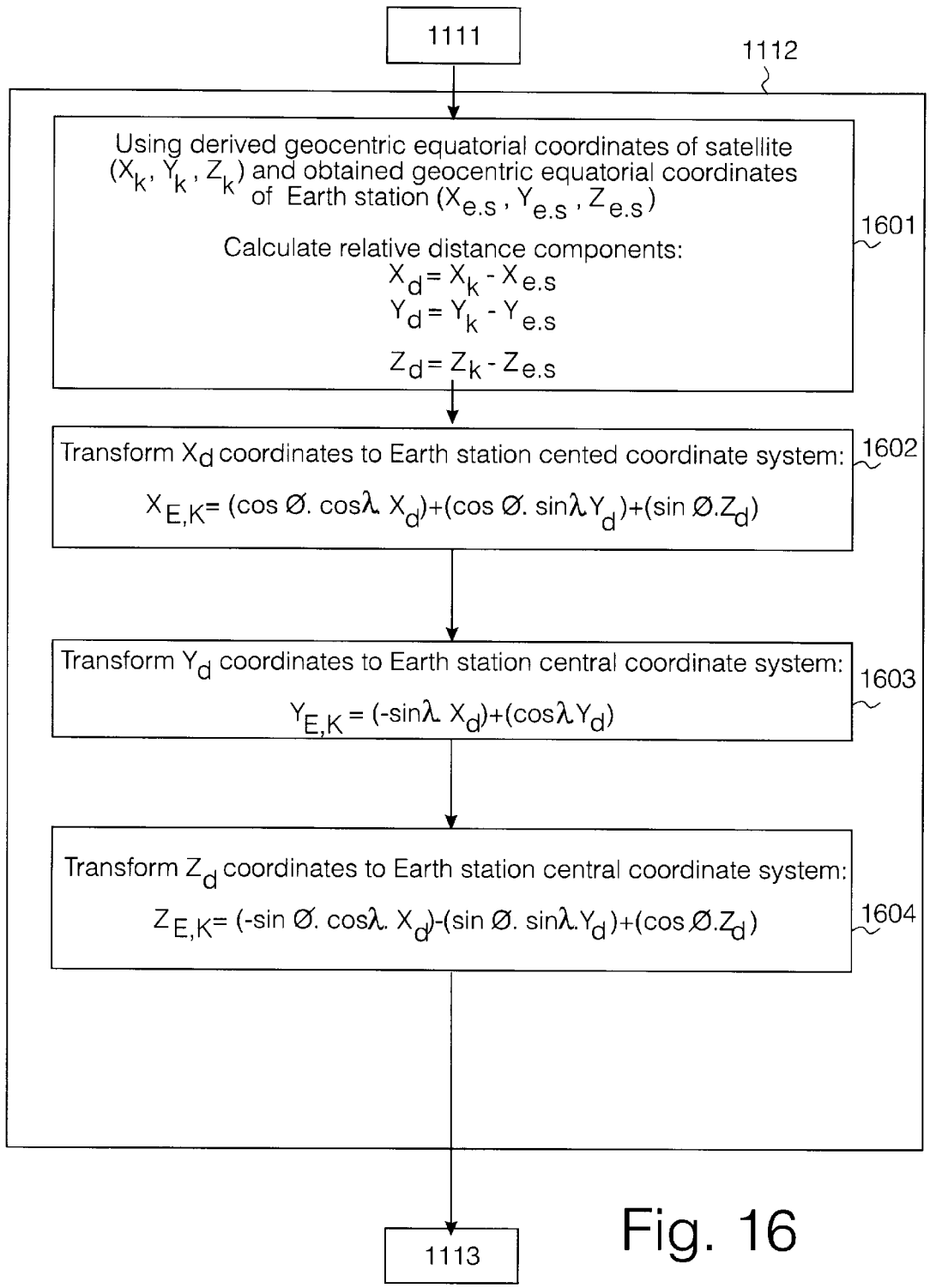
FIG. 16 further details the step identified in FIG. 11 relating to calculation of the satellite position relative to the Earth station.

Following calculation of the geocentric equatorial co-ordinates of the satellite at step 1111 in FIG. 11, control is passed to step 1112, wherein the position of the satellite relative to the Earth station centred co-ordinate system is calculated. The steps involved in calculating the satellite position relative to the Earth station centred co-ordinate system are detailed in FIG. 16 wherein at step 1601 relative distance components ($X_d$, $Y_d$, $Z_d$) are calculated in accordance with the following equations:

$$X_d = X_k - X_{e,s}$$

$$Y_d = Y_k - Y_{e,s}$$

$$Z_d = Z_k - Z_{e,s}$$

where: $X_k$, $Y_k$, $Z_k$ are the derived geocentric equatorial co-ordinates of the satellite calculated in step 1111 and $X_{e,s}$, $Y_{e,s}$, $Z_{e,s}$ are the geocentric equatorial co-ordinates of the Earth station obtained at step 1102. $X_{e,s}$, $Y_{e,s}$, $Z_{e,s}$ represent the distance components of the Earth station relative to the centre of the Earth and thus by subtracting these from their corresponding $X_k$, $Y_k$, $Z_k$ components respectively relative distances are obtained. These distances may be transformed to have meaning relative to an Earth station centred co-ordinate system as identified at steps 1602, 1603 and 1604 which follow on respectively from step 1601. Thus, at step 1602 the $X_d$ co-ordinate is effectively transformed to an Earth station centred co-ordinate system (of the type identified in FIG. 8 as $X_E$, $Y_E$, $Z_E$) to give the X co-ordinate ($X_{E,k}$) in accordance with the following equation:

$$X_{EK} = (\cos\emptyset \cdot \cos\lambda \cdot X_d) + (\cos\emptyset \cdot \sin\lambda \cdot Y_d) + (\sin\emptyset \cdot Z_d)$$

Similarly at step 1603 the Earth station centred co-ordinate ($Y_{E,k}$) is obtained in accordance with the following equation:

$$Y_{E,k} = (-\sin\lambda \cdot X_d) + (\cos\lambda \cdot Y_d)$$

Finally the Z co-ordinate ($Z_{E,k}$) is obtained at step 1604 in accordance with the following equation:

$$Z_{E,k} = (-\sin\emptyset \cdot \cos\lambda \cdot X_d) - (\sin\emptyset \cdot \sin\lambda \cdot Y_d) + (\cos\emptyset \cdot Z_d)$$

wherein the sines and cosines of the longitude and latitude are provided in accordance with step 1102 as described above.

Finally the Earth station processor 203 is required to calculate the angle of azimuth, angle of elevation and the true range of the satellite relative to the location position of the Earth station, that is relative to the Earth station location as obtained at step 1102.

Figure 17:
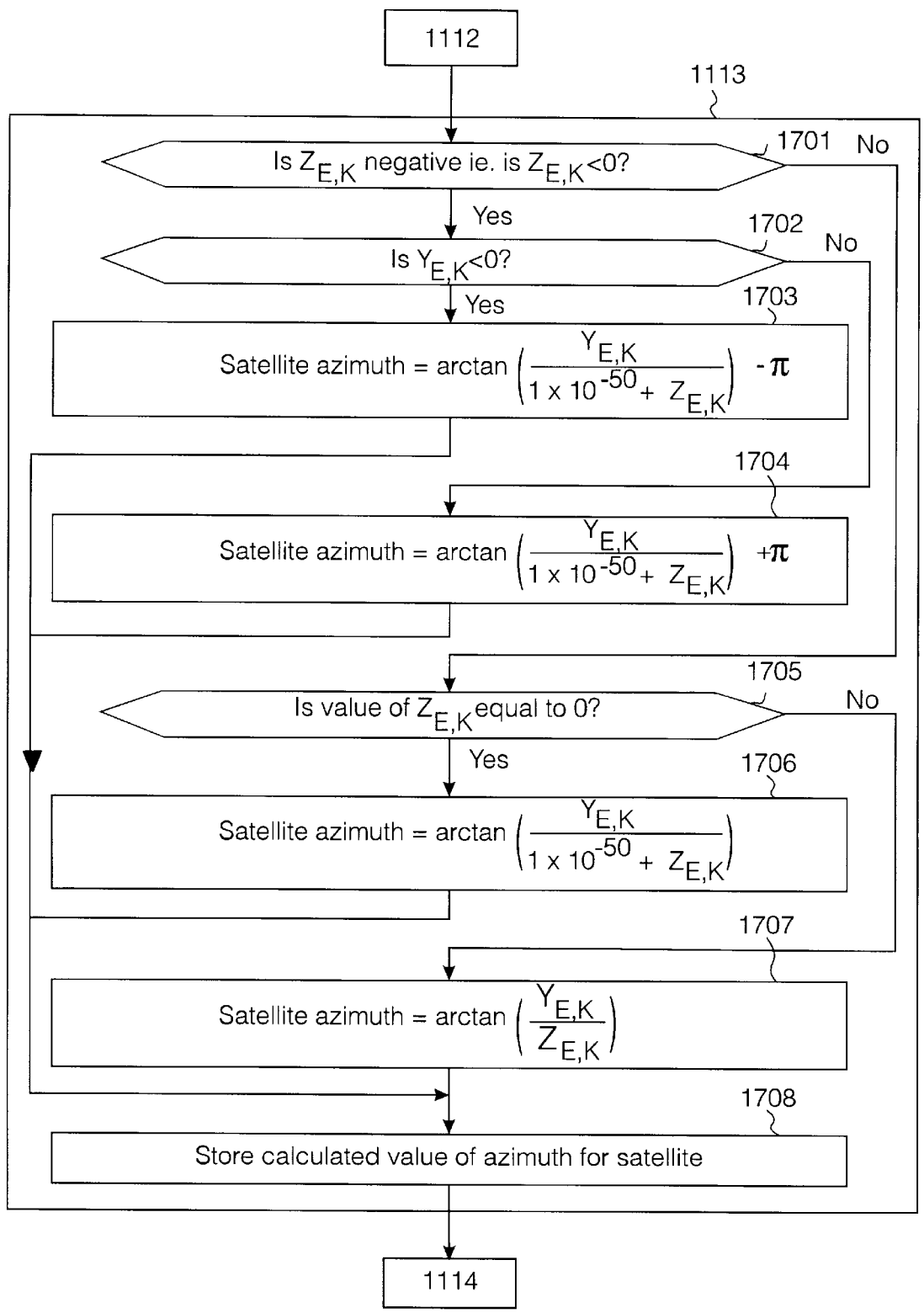
FIG. 17 further details the step identified in FIG. 11 relating to calculation of the angle of azimuth of the satellite.

Step 1113 of FIG. 11, as identified earlier, comprises calculation of the angle of azimuth of the satellite and this is further detailed in FIG. 17. Taking the Earth station centred co-ordinate $Y_{E,k}$ to correspond to the direction East (as identified in FIG. 8) and the Z co-ordinate, $Z_{E,k}$ to correspond to the distance component in the direction of North then the azimuth is calculated in accordance with the steps is identified in FIG. 17. At step 1701 the Earth station processor 203 is configured to ask a question as to whether the calculated $Z_{E,K}$ is negative and thus this question relates to whether the satellite is south of the Earth station. If the question asked at step 1701 is answered in the affirmative then control is passed to step 1702 wherein a further question is asked as to whether the $Y_{E,K}$ is also negative. The question asked at step 1702 may be construed to correspond to whether the satellite is West of the Earth station. If the question asked at step 1702 is answered in the affirmative then control is passed to step 1703 wherein the satellite azimuth is calculated in accordance with the following equation:

$$\text{Satellite azimuth} = \arctan(Y_{E,K}/(1\times 10^{-50} + Z_{E,K})) - \pi$$

where the numerical value $1 \times 10^{-50}$ is incorporated in the calculation for reasons related to prevention of computational overflow.

However, if the question asked at step 1701 is answered in the affirmative and the question asked at step 1702 is answered in the negative, then control is passed to step 1704 wherein the satellite azimuth is calculated in accordance with the following equation:

Satellite azimuth=arctan $(Y_{E,K}/(1\times10^{-50}+Z_{E,K}))+\pi$

Finally, if the question asked at 1701 is answered in the negative then control is passed to step 1705 wherein a further question is asked as to whether the value of $Z_{E,K}$ is equal to 0 (in other words whether the satellite has the same latitude as the Earth station). If the question asked at step 1705 is answered in the affirmative then the satellite azimuth is calculated in accordance with the equation identified at step 1706 as follows:

Satellite azimuth=arctan $(Y_{E,K}/(1\times10^{-50}+Z_{E,K}))$

However, if the question asked at step 1705 is answered in the negative then control is directed to step 1707 wherein the satellite azimuth is calculated in accordance with the following equation:

Satellite azimuth=arctan $(Y_{E,K}/Z_{E,K})$

Following any of steps 1703, 1704, 1706 or 1707 control is passed to step 1708 wherein the calculated value of the azimuth for the satellite is stored for subsequent use.

Figure 18:
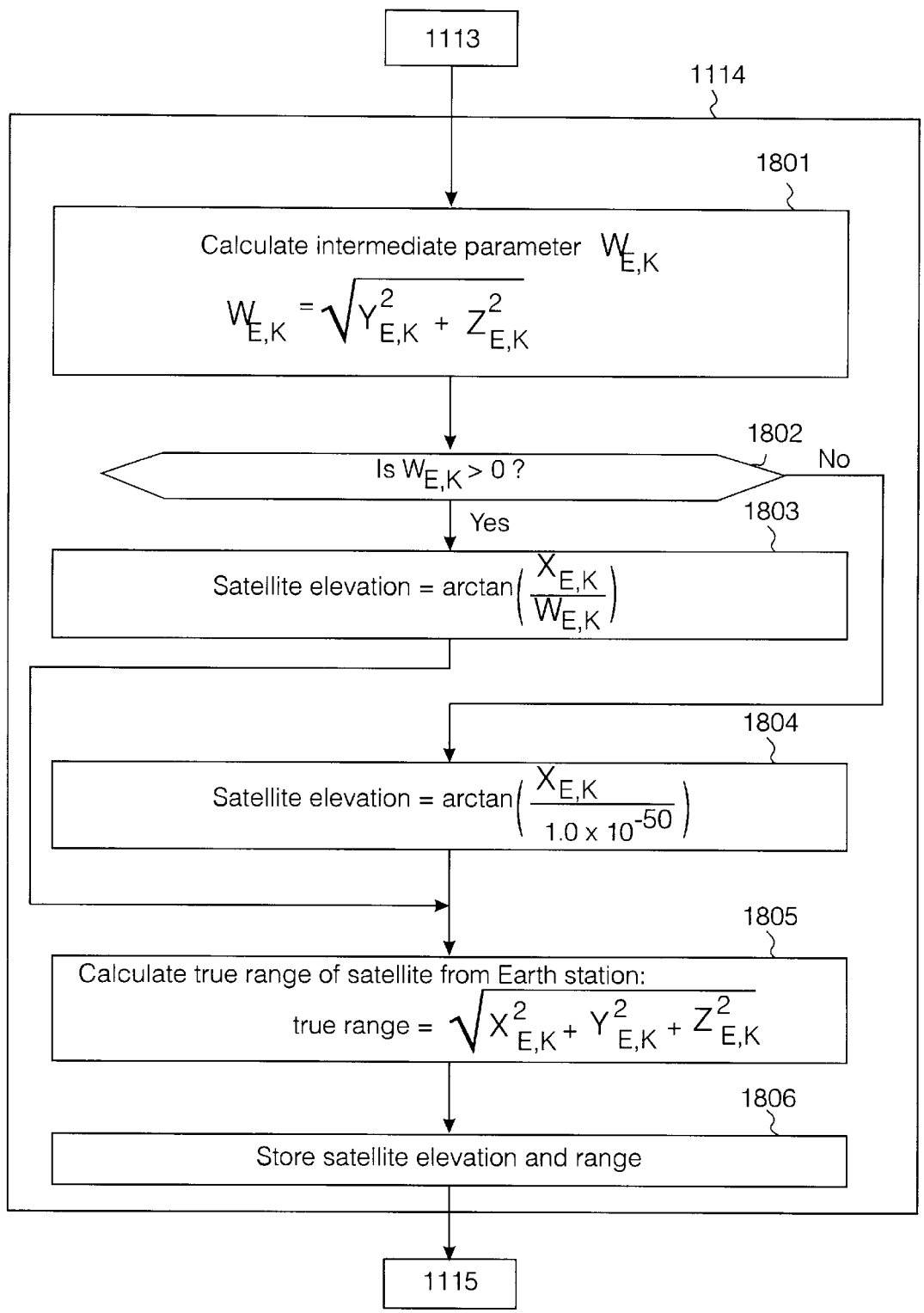
FIG. 18 further details the step identified in FIG. 11 relating to the calculation of the angle of elevation and the true range of the satellite in relation to the Earth station.

Following step 1113 of FIG. 11, control is passed to step 1114 wherein the elevation of the satellite and the true range of the satellite are calculated from the Earth station centred co-ordinates. Step 1114 is further detailed in FIG. 18 wherein at step 1801 an intermediate parameter, $W_{E,K}$, representing the distance of the satellite from the Earth station in the $Y_{E,K}$-$Z_{E,K}$ plane ( that is the East—North plane), is calculated. The value of $W_{E,K}$ is given by the following equation:

$$W_{E,K} = \sqrt{(Y_{E,K}^2 + Z_{E,K}^2)}$$

Following step 1801 control is passed to step 1802 wherein a question is asked as to whether the calculated value of $W_{E,K}$ is greater than 0. Because the value of $W_{E,K}$ is given by the square root of the sum of the squares of the Easterly and Northerly components respectively, then a value of $W_{E,K}$ of less than 0 (ie, negative) is not allowed. However a value of $W_{E,K}$ of 0 is possible, this result effectively indicating that the satellite is positioned exactly vertically above the Earth station. By exactly vertically above it is meant that the satellite has the same angles of latitude and longitude as the Earth station. If the question asked at step 1802 is answered in the affirmative to the effect that the satellite is not directly above the Earth station then control is passed to step 1803 wherein the satellite elevation angle is calculated in accordance with the following formula:

Satellite elevation=arctan $(X_{E,K}/W_{E,K})$ where $X_{E,K}$ is the distance component of the satellite from the Earth station in the direction perpendicular to the $Y_{E,K}$-$Z_{E,K}$ plane.

However if the question asked at step 1802 is answered in the negative (i.e, $W_{E,K}$ is equal to 0) then control is passed to step 1804 wherein the satellite elevation angle is calculated in accordance with the following equation:

Satellite elevation=arctan $(X_{E,K}/(1\times10^{-50}))$ where the divisor $(1\times10^{-50})$ is an arbitrarily chosen number utilised to prevent the arctangent of infinity being taken.

Following either steps 1803 or 1804 control is passed to step 1805 wherein the true range of the satellite from the Earth station is calculated in accordance with pythagoras' theorem in three dimensions as follows:

$$\text{True range} = \sqrt{(X_{E,K}^2 + Y_{E,K}^2 + Z_{E,K}^2)}$$

Following step 1805 control is passed to step 1806 wherein the calculated satellite elevation angle and the true range of the satellite from the Earth station are stored for use in subsequent processing.

Following calculation of the azimuth, elevation and range of each satellite for which data is held in look-up table 606, processor 203 is configured to perform the following steps. First, an optimum satellite for establishing communication with is selected. It will be understood by those skilled in the art that the criteria for selection may vary depending upon a given commercial service provider's requirements in terms of contractual arrangements with respect to usage of particular systems of satellites, satellite availability etc. Furthermore, the selection process may incorporate an interactive facility for enabling a given Earth station user to select a particular satellite according to their preference, as indicated in FIG. 6.

In the case of Earth station-Satellite systems of type category 2, category 4 or category 6, processing is restricted to selection of a geostationary satellite only. Suitable criteria for enabling optimum selection of a geostationary satellite may in general be different from non-geostationary satellite selection criteria. Thus, for example the selection of a geostationary satellite may be determined upon consideration of the capacity of the given satellite and/or its current status with respect to present stress. By present stress it is meant the level of usage of the satellite with respect to providing services for users located elsewhere. Stress consideration of this kind may be incorporated by suitable processing so as to ascertain the likely degree of communication efficiency provided. However, in general a simple system may comprise determination of which geostationary satellite will provide the highest signal strengths with respect to the given Earth station being used.

In the case of the Earth station-satellite systems utilising non-geostationary satellites the criteria for selection may be configured in a relatively simple manner, such as for example selecting the satellite which has the most favourable elevation and azimuth with respect to the Earth station. The most favourable elevation and azimuth may for example comprise values which are determined to correspond to a satellite having the longest length of time left before the satellite disappears over the horizon with respect to the last recorded position of the Earth station. Thus in this way, processor 203 may be simply configured to read the azimuth and elevation angles of each satellite previously determined in the process detailed in FIG. 11. From the calculated azimuth and elevation it will be understood by those skilled in the art that it is a relatively straight forward matter to establish which satellite will have the longest period of time left before it disappears over the horizon. Thus in the case of non-geostationary satellites in particular, it may not necessarily be the satellite with the greatest signal strength (the closest satellite to the Earth station) which is selected. The non-geostationary case is further complicated by the preferable incorporation of a feature relating to satellite handover. Thus, if a given Earth station is communicating with a particular satellite, then the Earth station is preferably configured to establish communication with a second satellite prior to the first satellite passing over the horizon. Certain theoretical considerations may be taken into account with respect to the hand-over event, such as for example the communications hand-over being effected when the satellite reaches a predetermined position such that said position is arrived at before said satellite reaches the point where communication with the Earth station would be lost.

Finally, as indicated in FIG. 1 a given Earth station may be configured to enable communication to be established with both non-geostationary and geostationary satellites, this being represented by the plus/minus geostationary bracketed option in categories 1, 3 and 5. For systems configured to enable communication with both types of satellite, then processing performed with respect to selection of a given satellite may additionally comprise factors related to the suitability of a geostationary satellite over a non-geostationary satellite and vice-versa, this selection possibly being based upon general considerations of geostationary and non-geostationary satellites or upon specific considerations relating to a particular geostationary satellite and/or to a particular non-geostationary satellite.

Whatever particular selection criteria are employed with respect to selection of a given satellite for an Earth station to establish communication with, processor 203 is configured to calculate the appropriate antenna steering parameters based upon the azimuth and elevation values determined for the selected optimum satellite. Upon calculation of the appropriate antenna steering parameters, which may comprise for example calculation of phase weights in the case of an electronically steerable phased array antenna, processor 203 is suitably configured to deliver the appropriate control signals to the Earth station antenna so that the antenna may be configured for operation in the direction corresponding to the elevation and azimuth of the selected optimum satellite, as previously detailed in FIG. 6. In the case of an electronically steerable phased array antenna, a Butler matrix may be employed to effect steering of the array of elements so as to transmit or receive a radiation beam. Alternatively, another suitable electronic phasing device may be utilised and whatever device is used, in general the signals from $2^n$ separate elements of an array are required to be combined together with their correct relative phases to produce $2^n$ separate elements of an array are required to be combined together with their correct relative phases to produce $2^n$ outputs, each of which corresponds to a main lobe pointing in different directions.

REFERENCES (1) Cionaith J Cullen and Xavier Benedicto—The Networking of Dynamic Satellite Constellations in a Global Personal Communication System; ICUPC' 93 pp 279–283.

I claim:

1. A method of establishing communication with a satellite, comprising steps of:

at an earth based communications device having an antenna capable of transmitting and receiving a radiation beam:

storing satellite position data for at least one satellite;

obtaining a location position data of said earth station;

obtaining an azimuth data and elevation data of said antenna;

utilizing said satellite position data to calculate a position data of said at least one satellite in relation to said location position;

in response to said obtained azimuth and elevation data, determining a direction in which to configure an antenna for operation with said at least one satellite; and configuring said antenna for operation in said direction so as to enable transmission of telecommunications data from said earth station to said satellite and vice versa, wherein said data comprises data from the set comprising: image data; speech data; and text data.

2. A method according to claim 1, wherein said antenna comprises an electronically steerable phased array arrangement, configurable to operate a substantially narrow beam.

3. A method according to claim 1, wherein said stored position data comprises orbital parameters of a plurality of non-geostationary satellites.

4. A method according to claim 1, wherein said stored position data comprises orbital information of at least one geostationary satellite.

5. A method according to claim 1, wherein said stored position data is time stamped to enable correction of said data for the time elapsed since said data was created.

6. A method according to claim 1, wherein said stored position data is accompanied by a parameter indicating a reliability of said data.

7. A method according to claim 1, wherein said stored position data is derived by downloading said data from a satellite.

8. A method according to claim 1, wherein said step of obtaining said location position data comprises obtaining geocentric equatorial co-ordinates of said earth based communications device.

9. A method according to claim 1, wherein said step of obtaining said location position data comprises obtaining said location position information from a GPS satellite.

10. A method according to claim 1, wherein said step of obtaining said azimuth and elevation data comprises the steps of:

electronically reading a compass to find the direction of true North; and electronically reading a level finding device.

11. A method according to claim 1, wherein said step of obtaining said azimuth and elevation comprises sad earth based communications device utilizing GPS data via a plurality of antenna.

12. A method according to claim 1, wherein said earth based communications device is mobile.

13. A method according to claim 1, wherein said earth based communications device is mounted on a vehicle.

14. A method according to claim 1, wherein said earth based communications device is portable.

15. A method according to claim 1, wherein said earth based communications device comprises a lap top type computational device.

16. A method according to claim 1, wherein said step of calculating said position data of said satellites in relation to said location position data comprises calculating the azimuth the elevation of a said satellite.

17. A method according to claim 1, wherein said calculation of said position data of said satellite in relation to said location position data comprises, the steps of:

calculating the mean motion of the satellite and a mean anomaly;

calculating an eccentric anomaly;

calculating a true anomaly and orbital co-ordinates of said satellite;

calculating a position of said satellite in relation to the center of the Earth;

calculating the satellite's position co-ordinates in relation to the Earth station; and calculating the satellite's azimuth and elevation in relation to the Earth station.

18. A method according to claim 1, wherein said step of calculating said position of the satellite in relation to the location position additionally comprises calculation of a range of said satellite from said Earth station.

19. A method according to claim 1, wherein said step of selecting at least one of said satellites comprises determination of a period of time available before said satellite substantially reaches a horizon viewable from said earth based communications device.

20. A method according to claim 1, wherein said step of determining a direction in which to configure said antenna for operation comprises the step of determining one or more further directions to facilitate hand over of communications from a first satellite to a second satellite.

21. A method according to claim 1, wherein said determined direction is updated in real time to facilitate continuous communication with a moving said earth based communications device.

22. A communications apparatus configurable to establish communication with a satellite, said apparatus comprising:

an antenna for transmitting and receiving data;

storage means for storing a table of satellite position data;

means for obtaining a location position of said communications device;

means for obtaining an azimuth and elevation data of said antenna;

position calculation means for utilizing said satellite position data to calculate a position of at least one satellite in relation to said location position;

selection means for selecting at least one of said satellites with which to establish communication;

direction determination means responsive to said obtained azimuth and elevation; and means for configuring said antenna for operation in said determined direction so as to enable transmission of telecommunications data from said earth station to said satellite and vice versa, wherein said data comprises data from the set comprising: image data; speech data; and text data.

23. Apparatus as claimed in claim 22 further comprising means for selecting at least one of a plurality of satellites, wherein said direction determining means is responsive to said selection means to determine a beam direction.

24. Apparatus according to claim 22, wherein said antenna comprises an electronically steerable phased array antenna.

25. Apparatus according to claim 22, wherein said table of position data comprises orbital parameters associated with each of said satellites.

26. Apparatus according to claim 22, wherein said stored position data is time stamped.

27. Apparatus according to claim 22, wherein said means for obtaining the location position comprises a GPS receiver for receiving information from a GPS satellite.

28. Apparatus according to claim 22, wherein said means for obtaining said azimuth and elevation data of said antenna comprises an electronic compass and an electronic level finding device.

29. Apparatus according to claim 22, wherein said means for obtaining said azimuth and elevation data of said antenna comprises a plurality of antennae, each of said antennae being configured to communicate with a GPS satellite.

30. Apparatus according to claim 22, wherein said earth based communications device is mounted on a vehicle.

31. Apparatus according to claim 22, wherein said position calculation means comprises means for calculating the azimuth and elevation data of a given satellite.

32. Apparatus according to claim 22, wherein said position calculation means for a given satellite is configured to carry out the steps of:

calculating a mean motion of the satellite and a mean anomaly;

calculating an eccentric anomaly;

calculating a true anomaly and orbital co-ordinates of said satellite;

calculating a position of said satellite in relation to the center of the Earth;

calculating the satellite's position co-ordinates in relation to the earth based communications device; and calculating the satellite's azimuth and elevation in relation to the earth based communications device.

33. Apparatus according to claim 22, wherein said position calculation means also comprises means for calculating the range of a given satellite from said Earth station.

34. Apparatus according to claim 22, wherein said selection means comprises means for determining the period of time available before said satellite substantially reaches the Earth station's horizon.

35. Apparatus according to claim 22, wherein said direction determination means comprises means for determining one or more further directions to facilitate hand over of communications from a first satellite to a second satellite.

36. Apparatus according to claim 22, wherein said direction determination means additionally comprises means for updating, in real time, said direction so as to facilitate continuous communication with a moving Earth station.

37. Apparatus according to claim 22, wherein said apparatus is configurable to provide a video conferencing facility.

38. A satellite communications link for facilitating communication with an earth based communications device having an antenna, said link being configured in accordance with said station performing the steps of:

storing a table of satellite position data for a plurality of satellites;

obtaining the location position of said earth based communications device;

obtaining the azimuth and elevation of said antenna;

utilizing said tabulated satellite position data to calculate the position of at least one said satellite in relation to said location position;

in response to said obtained azimuth and elevation data, determining a direction in which to configure said antenna for operation with at least one satellite; and configuring said antenna for operation in said direction so as to enable transmission of telecommunications data from said earth station to said satellite and vice versa, wherein said data comprises data from the set comprising: image data; speech data; and text data.

39. A satellite communications link according to claim 38, wherein said link facilitates the transmission of and the receiving of information by said earth based communications device.

40. A satellite communications link according to claim 38, wherein said link is established through configuration of a substantially narrow beam.

41. A satellite communications link according to claim 38, wherein said communications link comprises communication between said earth based communications device and a first satellite followed by communication between said earth based communications device and a second satellite so as to facilitate a communications hand over between satellites.

42. A satellite communications link according to claim 38, wherein said link is established in response to said calculated position of said satellite in relation to said location position.

43. A satellite communications link according to claim 37 wherein said link is configurable to provide a video conferencing facility.

* * * * *